US010358086B2

(12) United States Patent
Tanaka et al.

(10) Patent No.: US 10,358,086 B2
(45) Date of Patent: Jul. 23, 2019

(54) VEHICLE PERIPHERY IMAGE DISPLAY DEVICE AND CAMERA ADJUSTMENT METHOD

(71) Applicant: DENSO CORPORATION, Kariya, Aichi-pref. (JP)

(72) Inventors: Hitoshi Tanaka, Kariya (JP); Muneaki Matsumoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 200 days.

(21) Appl. No.: 15/025,126

(22) PCT Filed: Sep. 17, 2014

(86) PCT No.: PCT/JP2014/004768
§ 371 (c)(1),
(2) Date: Mar. 25, 2016

(87) PCT Pub. No.: WO2015/045329
PCT Pub. Date: Apr. 2, 2015

(65) Prior Publication Data
US 2016/0236619 A1 Aug. 18, 2016

(30) Foreign Application Priority Data

Sep. 30, 2013 (JP) ................. 2013-204474

(51) Int. Cl.
*H04N 7/18* (2006.01)
*B60R 1/00* (2006.01)
(Continued)

(52) U.S. Cl.
CPC .................. *B60R 1/00* (2013.01); *G06T 7/80* (2017.01); *H04N 5/23293* (2013.01);
(Continued)

(58) Field of Classification Search
CPC .......... G06T 7/80; B50R 1/00; H04N 5/23293
(Continued)

(56) References Cited

U.S. PATENT DOCUMENTS

2004/0027456 A1* 2/2004 Pierce .................. H04N 17/002
348/175
2008/0181488 A1* 7/2008 Ishii .......................... B60R 1/00
382/154
(Continued)

FOREIGN PATENT DOCUMENTS

JP    2010-244326 A    10/2010
WO    2015/045329 A1    4/2015

OTHER PUBLICATIONS

"Thread: Backup Camera Calibration." Audizine. (http://www.q3ownersclub.co.uk/forum/rvc-calibration_topic2421.html Oct. 10, 2012. (Year: 2012).*

(Continued)

*Primary Examiner* — Farzana Hossain
(74) *Attorney, Agent, or Firm* — Knobbe, Martens, Olson & Bear, LLP

(57) ABSTRACT

An onboard periphery image display device for adjusting transformation rule of each camera mounted on an automobile is provided. A predetermined calibration pattern of a calibration member is placed in a capture area of a reference camera and another calibration pattern of the calibration member is placed in a capture area of an adjustment-targeted camera. The onboard periphery image display detects a coordinate of an image of a reference calibration pattern based on the image of the predetermined calibration pattern captured by the reference camera, detects an coordinate of an image of an adjustment calibration pattern based on the image of the another calibration pattern captured by the adjustment-targeted camera, and adjusts the transformation (Continued)

rule determined for the adjustment-targeted camera based on the detected coordinates.

11 Claims, 22 Drawing Sheets

(51) Int. Cl.
 H04N 5/232 (2006.01)
 H04N 5/247 (2006.01)
 G06T 7/80 (2017.01)
(52) U.S. Cl.
 CPC ............ *H04N 5/247* (2013.01); *H04N 7/181* (2013.01); *B60R 2300/105* (2013.01); *B60R 2300/303* (2013.01); *B60R 2300/402* (2013.01); *G06T 2207/30204* (2013.01); *G06T 2207/30252* (2013.01)
(58) Field of Classification Search
 USPC ........................................................ 348/148
 See application file for complete search history.

(56) References Cited

U.S. PATENT DOCUMENTS

| 2008/0231710 | A1 | 9/2008 | Asari et al. | |
| 2009/0299684 | A1 | 12/2009 | Imanishi et al. | |
| 2010/0194886 | A1* | 8/2010 | Asari ..................... | G06T 7/85 348/148 |
| 2011/0216194 | A1* | 9/2011 | Kosaki ................... | H04N 7/18 348/148 |
| 2012/0287232 | A1* | 11/2012 | Natroshvili .............. | G06T 7/85 348/36 |
| 2012/0314073 | A1* | 12/2012 | Shimoda .............. | G06T 7/0018 348/148 |
| 2014/0125774 | A1* | 5/2014 | Lee ....................... | G06T 3/4038 348/47 |

OTHER PUBLICATIONS

"Frequently Asked Questions." CoverGrip. (https://web.archive.org/web/20130720095943/http://www.covergrip.com/CoverGrip-Safety-Drop-Cloths/Frequently-Asked-Questions.aspx . Jul. 20, 2013. (Year: 2013).*
"Iron Craft '13 #12." Just Crafty Enough. (http://www.justcraftyenough.com/2013/06/iron-craft-13-12-crocheted-stone-tablecloth-weights/ Jun. 18, 2013. (Year: 2013).*
ISR dated Dec. 16, 2014 in a corresponding PCT application No. PCT/JP2014/004768.
Written Opinion dated Dec. 16, 2014 in a corresponding PCT application No. PCT/JP2014/004768.

* cited by examiner

VEHICLE PERIPHERY IMAGE DISPLAY DEVICE AND CAMERA ADJUSTMENT METHOD

CROSS REFERENCE TO RELATED APPLICATION

This application is based on Japanese Patent Applications No. 2013-204474 filed on Sep. 30, 2013, the disclosure of which is incorporated herein by reference.

TECHNICAL FIELD

The present disclosure relates to a vehicle periphery image display device to display an image around a vehicle and relates to an adjustment method of a camera used for the vehicle periphery image display device.

BACKGROUND ART

A publicly known technology transforms an image captured by an onboard camera into a projective image (bird's-eye image) representing the vehicle periphery (a state of the vehicle periphery viewed from above the vehicle).

A recently disclosed technology calibrates (adjusts) a camera when the camera or an electronic controller to control the camera is replaced or when a camera position or posture is misaligned while in use.

In the disclosed technology, the camera uses a transformation rule (parameter) to transform an image captured by the camera into a projective image. The transformation rule may come incorrect due to replacement of the camera or misalignment of the camera position or posture. In such a case, the technology assumes the camera to be an adjustment-targeted camera and corrects the transformation rule.

The description below explains a method known as the technology to correct the transformation rule.

When adjusting the camera's transformation rule at a factory, a specially shaped and sized calibration pattern is painted at a predetermined location of the ground in the factory. A vehicle is moved to a predetermined place to adjust the camera's transformation rule. This determines a positional relationship between the calibration pattern and the vehicle and accordingly determines a positional relationship between the calibration pattern and the camera provided for the vehicle. An arithmetic operation is used to adjust the camera's transformation rule.

A car dealership may not be able to ensure a special place to adjust the camera's transformation rule when adjusting the camera's transformation rule. To address this, the technology disclosed in patent literature 1 places one calibration pattern in a partially overlapping range between a capture range of the adjustment-targeted camera and a capture range of an adjacent reference camera (no adjustment needed). The technology adjusts the transformation rule determined for the adjustment-targeted camera so that the calibration pattern matches coordinates of the calibration pattern in the video in an image space that is projection-transformed according to a transformation rule determined for the reference camera.

In adjusting the camera's transformation rule by placing the calibration pattern at arbitrary location in the car dealership, the capture range of the adjustment-targeted camera overlaps with the capture range of a camera serving as a candidate for the reference camera and the calibration pattern is placed in the overlapping range. Otherwise, adjusting the transformation rule determined for the adjustment-targeted camera is difficult.

Additionally, depending on positions to place the calibration pattern, accuracy of the captured image of the calibration pattern is low, disabling accurate adjustment.

PRIOR ART LITERATURES

Patent Literature

Patent Literature 1: JP-2010-244326A

SUMMARY OF INVENTION

The present disclosure has been made in consideration of the foregoing. It is an object of the disclosure to provide a vehicle periphery image display device and a camera adjustment method capable of easily adjusting a transformation rule of an adjustment-targeted camera even when a calibration pattern is placed in a range except an overlap between a capture range of the adjustment-targeted camera and a capture range of a reference camera.

An onboard periphery image display device in a first example of the present disclosure is mounted on an automobile and comprises a plurality of cameras, a vehicle periphery image generation portion, a display apparatus, and an adjustment portion. The plurality of cameras are mounted on an automobile to image a periphery of the automobile. In accordance with a transformation rule determined for each camera provided to capture the image, the vehicle periphery image generation portion applies projection transform to the images captured by the cameras to generate a vehicle periphery image synthesized in a single image space. The vehicle periphery image represents the periphery of the automobile observed from a specified viewpoint. The display apparatus displays the vehicle periphery image generated by the vehicle periphery image generation portion. The adjustment portion adjusts the transformation rule determined for each of the cameras. In a situation where: a calibration member, in which a plurality of calibration patterns with predetermined sizes and shapes have a predetermined positional relationship, is placed around the automobile; a predetermined calibration pattern of the calibration patterns is placed in a capture area of a reference camera, which is a camera serving as a reference to adjust the transformation rule; and another calibration pattern of the calibration patterns is placed in a capture area of an adjustment-targeted camera, which is a camera targeted for adjustment of the transformation rule, the adjustment portion: detects a coordinate of an image of a reference calibration pattern through applying the projection transform to the image of the predetermined calibration pattern of the calibration member captured by the reference camera in accordance with the transformation rule determined for the reference camera; detects an coordinate of an image of an adjustment calibration pattern through applying the projection transform to the image of the another calibration pattern of the calibration member captured by the adjustment-targeted camera in accordance with the transformation rule determined for the adjustment-targeted camera; performs detecting a coordinate of an image of a provisional reference calibration pattern corresponding to the reference calibration pattern based on a positional relationship of the coordinate of the image of the adjustment calibration pattern with the calibration patterns or detecting a coordinate of an image of a provisional adjustment calibration pattern corresponding to the adjustment calibration pattern based on a positional relationship of the coordinate of the image of the reference calibration pattern with the calibration patterns; and adjusts the transformation rule determined for the adjustment-targeted camera so that the coordinate of the image of the provisional reference calibration pattern matches the coordinate of the image of the reference calibration pattern or the coordinate of the image of the provisional adjustment calibration pattern matches the coordinate of the image of the adjustment calibration pattern.

A camera adjustment method in a first example of the present disclosure is provided for an onboard periphery image display device including a plurality of cameras that are mounted on an automobile to image a periphery of the automobile; a vehicle periphery image generation portion that, in accordance with a transformation rule determined for each camera provided to capture the image, applies projection transform to the images captured by the cameras to generate a vehicle periphery image synthesized in a single image space, wherein the vehicle periphery image represents the periphery of the automobile observed from a specified viewpoint; and a display apparatus that displays the vehicle periphery image generated by the vehicle periphery image generation portion, and the camera adjustment method is provided for adjusting the transformation rules for the cameras. In a situation where: a calibration member, in which a plurality of calibration patterns with predetermined sizes and shapes have a predetermined positional relationship, is placed around the automobile; a predetermined calibration pattern of the calibration patterns is placed in a capture area of a reference camera, which is a camera serving as a reference to adjust the transformation rule; and another calibration pattern of the calibration patterns is placed in a capture area of an adjustment-targeted camera, which is a camera targeted for adjustment of the transformation rule, the camera adjustment method comprises detecting a coordinate of an image of a reference calibration pattern through applying the projection transform to the image of the predetermined calibration pattern of the calibration member captured by the reference camera in accordance with the transformation rule determined for the reference camera; detecting an coordinate of an image of an adjustment calibration pattern through applying the projection transform to the image of the another calibration pattern of the calibration member captured by the adjustment-targeted camera in accordance with the transformation rule determined for the adjustment-targeted camera; performing detecting a coordinate of an image of a provisional reference calibration pattern corresponding to the reference calibration pattern based on a positional relationship of the coordinate of the image of the adjustment calibration pattern with the calibration patterns or detecting a coordinate of an image of a provisional adjustment calibration pattern corresponding to the adjustment calibration pattern based on a positional relationship of the coordinate of the image of the reference calibration pattern with the calibration patterns; and adjusting the transformation rule determined for the adjustment-targeted camera so that the coordinate of the image of the provisional reference calibration pattern matches the coordinate of the image of the reference calibration pattern or the coordinate of the image of the provisional adjustment calibration pattern matches the coordinate of the image of the adjustment calibration pattern.

Even if capture ranges for the cameras do not overlap with each other, the onboard periphery image display device and the camera adjustment method according to the present disclosure can easily calibrate the adjustment-targeted camera by placing the calibration patterns in the corresponding capture ranges and performing the above-mentioned process.

In a conventional one, a very small (single) pattern may be displayed on a screen. Even in such a case, the onboard periphery image display device and the camera adjustment method according to the present disclosure uses the calibration member including different patterns placed in capture ranges for the different cameras to improve the accuracy for the cameras to detect calibration patterns. The onboard periphery image display device and the camera adjustment method according to the present disclosure can advantageously accurately perform the calibration by performing the above-mentioned process.

An onboard periphery image display device in a second example of the present disclosure is mounted on an automobile and comprises a plurality of cameras, a vehicle periphery image generation portion, a display apparatus and an adjustment portion. The plurality of cameras are mounted on an automobile to image a periphery of the automobile. In accordance with a transformation rule determined for each camera provided to capture the image, the vehicle periphery image generation portion applies projection transform to the images captured by the cameras to generate a vehicle periphery image synthesized in a single image space. The vehicle periphery image represents the periphery of the automobile observed from a specified viewpoint. The display apparatus displays the vehicle periphery image generated by the vehicle periphery image generation portion. The adjustment portion adjusts the transformation rule determined for each of the cameras. In a situation where: calibration members, in which a plurality of calibration patterns with predetermined sizes and shapes and having a predetermined positional relationship, are placed around the automobile; a predetermined calibration pattern of the calibration patterns is placed in a capture area of a predetermined camera; and another calibration pattern of the calibration patterns is placed in a capture area of another camera, the adjustment portion: of one set of two adjustment-targeted cameras that are capable of independently capturing two calibration patterns of a predetermined calibration member of the calibration members, uses one camera as a provisional reference camera and the other camera as an adjustment-targeted camera; detects a coordinate of an image of a provisional reference calibration pattern (B) through, in accordance with the transformation rule determined for the provisional reference camera, applying the projection transform to the image of a predetermined calibration pattern of the two calibration patterns captured by the provisional reference camera; detects a coordinate of an image of an adjustment calibration pattern through, in accordance with the transformation rule determined for the adjustment-targeted camera, applying the projection transform to the image of the other calibration pattern of the two calibration patterns captured by the adjustment-targeted camera; performs detecting a coordinate of an image of a provisional reference calibration pattern (B') corresponding to the provisional reference calibration pattern (B) based on a positional relationship of the coordinate of the image of the adjustment calibration pattern with the two calibration patterns or detecting a coordinate of an image of a provisional adjustment calibration pattern corresponding to the adjustment calibration pattern based on a positional relationship of the coordinate of the image of the provisional reference calibration pattern with the two calibration patterns; and adjusts the transformation rule determined for the adjustment-targeted camera so that the coordinate of the image of the provisional reference calibration pattern (B') matches the coordinate of the image of the provisional reference calibration pattern (B) or the coordinate of the image of the provisional adjustment calibration pattern matches the coordinate of the image of the adjustment calibration pattern. Said set-by-set-basis adjustment is applied to adjust the transformation rules for all the cameras.

A camera adjustment method in a second example of the present disclosure is provided for an onboard periphery image display device including: a plurality of cameras that are mounted on an automobile to image a periphery of the automobile; a vehicle periphery image generation portion that, in accordance with a transformation rule determined for each camera provided to capture the image, applies projection transform to the images captured by the cameras to generate a vehicle periphery image synthesized in a single image space, wherein the vehicle periphery image represents the periphery of the automobile observed from a specified viewpoint; and a display apparatus that displays the vehicle periphery image generated by the vehicle periphery image generation portion. The camera adjustment method is provided for adjusting the transformation rules for the cameras. In a situation where: calibration members, in which a plurality of calibration patterns with predetermined sizes and shapes have a predetermined positional relationship, are placed around the automobile; a predetermined calibration pattern of the calibration patterns is placed in a capture area of a predetermined camera; and another calibration pattern of the calibration patterns is placed in a capture area of another camera, the camera adjustment method comprises: of one set of two adjustment-targeted cameras that are capable of independently capturing two calibration patterns of a predetermined calibration member of the calibration members, using one camera as a provisional reference camera and the other camera as an adjustment-targeted camera; detecting a coordinate of an image of a provisional reference calibration pattern (B) through, in accordance with the transformation rule determined for the provisional reference camera, applying the projection transform to the image of a predetermined calibration pattern of the two calibration patterns captured by the provisional reference camera; detecting a coordinate of an image of an adjustment calibration pattern through, in accordance with the transformation rule determined for the adjustment-targeted camera, applying the projection transform to the image of the other calibration pattern of the two calibration patterns captured by the adjustment-targeted camera; performing detecting a coordinate of an image of a provisional reference calibration pattern (B') corresponding to the provisional reference calibration pattern (B) based on a positional relationship of the coordinate of the image of the adjustment calibration pattern with the two calibration patterns or detecting a coordinate of an image of a provisional adjustment calibration pattern corresponding to the adjustment calibration pattern based on a positional relationship of the coordinate of the image of the provisional reference calibration pattern with the two calibration patterns; and adjusting the transformation rule determined for the adjustment-targeted camera so that the coordinate of the image of the provisional reference calibration pattern (B') matches the coordinate of the image of the provisional reference calibration pattern (B) or the coordinate of the image of the provisional adjustment calibration pattern matches the coordinate of the image of the adjustment calibration pattern. Said set-by-set-basis adjustment is applied to adjust the transformation rules for all the cameras.

In the onboard periphery image display device and the camera adjustment method according to the present disclosure, even when all cameras are to be adjusted due to, for example, replacement of the electronic control unit, it is possible to easily calibrate adjustment-targeted cameras by placing the calibration patterns in the corresponding capture ranges and performing the above-mentioned process even if the cameras' capture ranges do not overlap.

In a conventional one, a very small single pattern may be displayed on a screen. In such a case, the onboard periphery image display device and the camera adjustment method according to the present disclosure uses the calibration member containing different calibration patterns placed in capture ranges for the different cameras to improve the accuracy for the cameras to detect calibration patterns. The onboard periphery image display device and the camera adjustment method can advantageously accurately perform the calibration by performing the above-mentioned process.

EMBODIMENTS FOR CARRYING OUT INVENTION

The description below explains embodiments of a vehicle periphery image display device 1 according to the present disclosure with reference to the accompanying drawings. The vehicle periphery image display device 1 is provided as an example of onboard periphery image display devices.

(First Embodiment)

The vehicle periphery image display device 1 according to an embodiment calibrates (adjusts) a camera by adjusting a transformation rule of projection transform applied to an image captured by a camera (onboard camera) mounted on a vehicle.

a) The description below first explains a basic configuration of the vehicle periphery image display device 1 according to the embodiment with reference to FIG. 1.

Figure 1:
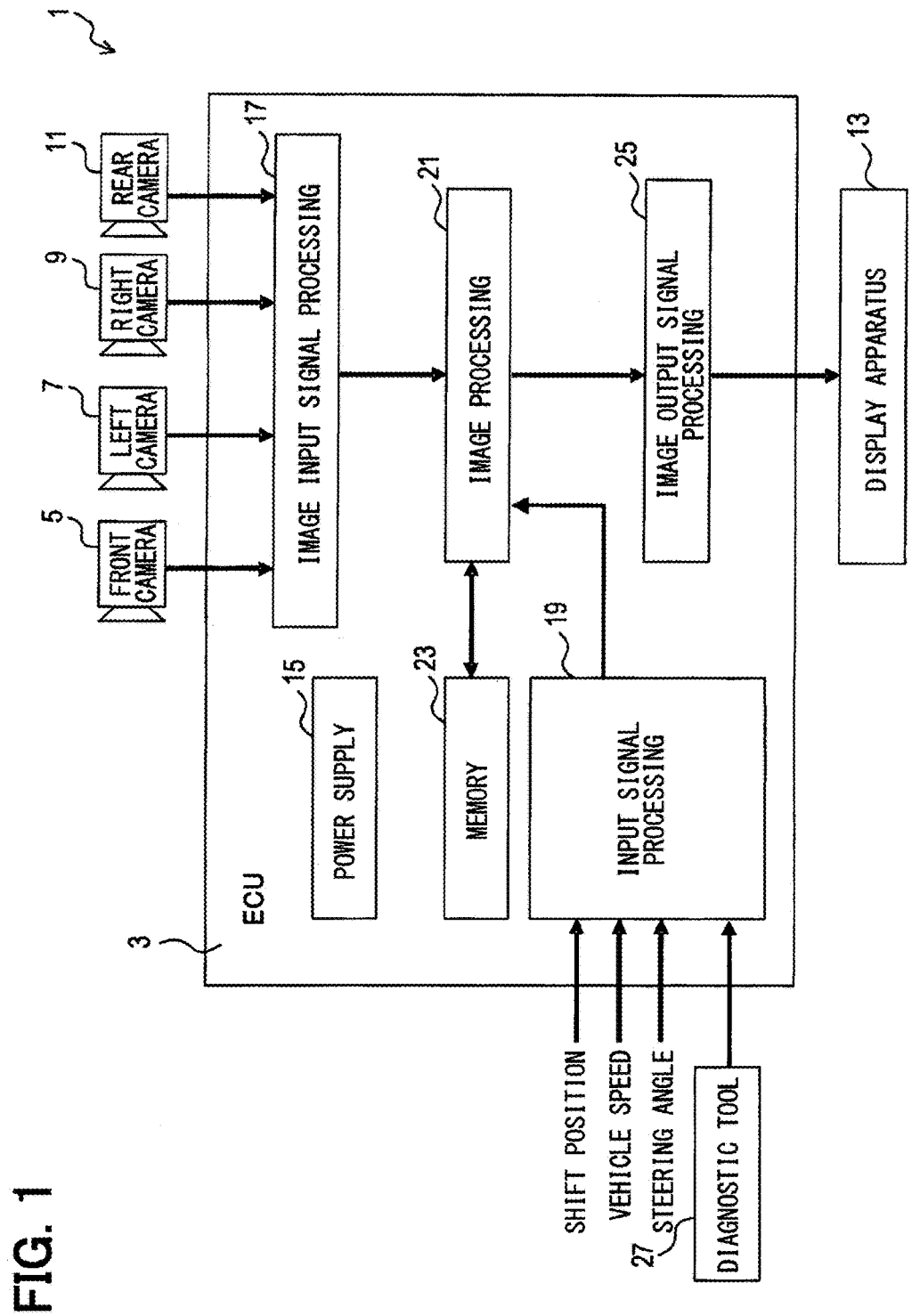
FIG. 1 is a block diagram illustrating a configuration of a vehicle periphery image display device according to a first embodiment.

As illustrated in FIG. 1, the vehicle periphery image display device 1 according to the embodiment is mounted on a vehicle (automobile) and displays a captured image around the vehicle. The vehicle periphery image display device 1 includes an electronic control unit (ECU) 3, a front camera 5, a left camera 7, a right camera 9, a rear camera 11, and a display apparatus 13. The ECU 3 includes a publicly known microcomputer. The front camera 5 is placed at the front of the vehicle. The left camera 7 is placed at the left of the vehicle. The right camera 9 is placed at the right of the vehicle. The rear camera 11 is placed at the rear of the vehicle. The display apparatus 13 displays images.

A wide angle camera is used for each of the four cameras 5 through 11. The purpose is to transform images captured by the four cameras 5 through 11 into a projective image (a bird's-eye image of the vehicle viewed from above the vehicle) synthesized in a single image space so that the image covers an entire area around the vehicle.

The front camera 5 is embedded at the center of the vehicle front in the vehicle width direction so as to capture images of the front side of the vehicle.

The left camera 7 is embedded at the center or toward the front of the left side of the vehicle in the longer direction of the vehicle so as to capture images of the left side of the vehicle.

The right camera 9 is embedded at the center or toward the front of the right side of the vehicle in the longer direction of the vehicle so as to capture images of the right side of the vehicle.

The rear camera 11 is embedded at the center of the vehicle rear in the vehicle width direction so as to capture images of the back side of the vehicle.

The ECU 3 includes a power supply 15, an image input signal processing portion 17, an input signal processing portion 19, an image processing portion 21, memory 23, and an image output signal processing portion 25. The power supply 15 supplies the power to the ECU 3.

The image input signal processing portion 17 separates a video signal from analog capture data supplied from the cameras 5 through 11 and outputs the video signal to the image processing portion 21.

The input signal processing portion 19 processes input shift position information, vehicle speed information, steering angle information, and a signal from a diagnostic tool 27. The input signal processing portion 19 supplies the image processing portion 21 with the shift position information indicating forward or backward movement, the vehicle speed information indicating a low or high speed, the steering angle information indicating right or left rotation of a steering wheel or a rotation angle, and an instruction from the diagnostic tool.

The image processing portion 21 converts a video signal from an analog signal to a digital signal. The image processing portion 21 processes necessary information using the memory 23 and retrieves necessary data from the below-described image process concerning a calibration sheet 31 (see FIG. 2). The image processing portion 21 outputs the data (digital signal) to the image output signal processing portion 25.

As will be described later, the image process concerning the calibration sheet 31 detects calibration pattern A (hereinafter simply referred to as a pattern) at one end of the calibration sheet 31 and detects pattern B (maintaining predetermined positional relationship with pattern A) from the data of pattern A.

Based on the information from the input signal processing portion 19, the image processing portion 21 converts a video signal to a top-view video when the vehicle speed is low, for example. In more detail, the image processing portion 21 applies projection transform to images captured by the cameras. The projection transform complies with a transformation rule predetermined for each of the cameras that captured the images. The image processing portion 21 synthesizes the images on a single image space and generates a vehicle periphery image representing the vehicle periphery observed from a predetermined viewpoint. The image processing portion 21 is provided as an example of a vehicle periphery image generation portion and a vehicle periphery image generation means.

The memory 23 saves a video signal from the image processing portion 21 and coordinate information about apex CT (see FIG. 2) as a feature point for pattern A or B.

The image output signal processing portion 25 converts a video signal input from the image processing portion 21 from a digital signal to an analog signal and outputs the video signal to the display apparatus 13.

The display apparatus 13 displays a video signal (consequently an image) input from the image output signal processing portion 25 and is available as a liquid crystal display, for example.

For example, a microcomputer process implements the input signal processing portion 19 or the image processing portion 21 mentioned above.

b) The description below explains the calibration sheet 31 used for camera calibration according to the first embodiment.

<Configuration of the Calibration Sheet 31>

The description below explains a configuration of the calibration sheet 31.

Figure 2:
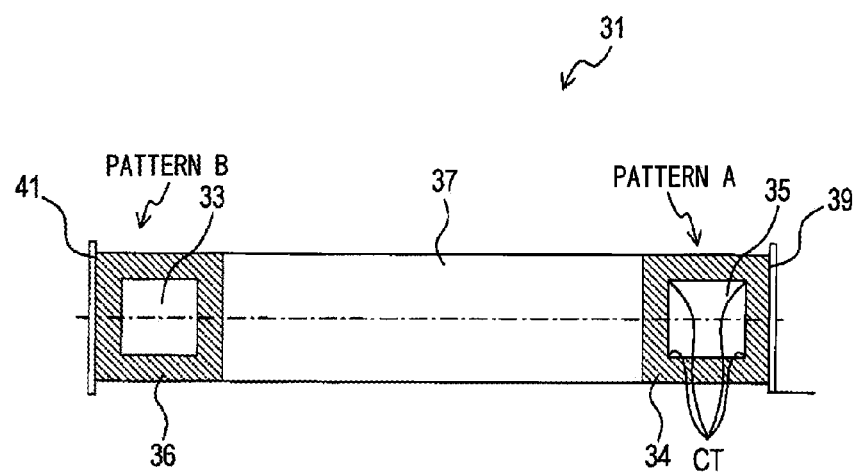
FIG. 2 is a plan view illustrating a calibration sheet including patterns A and B.

As illustrated in FIG. 2, the calibration sheet 31 is provided as a foldable sheet 4700 mm×900 mm×5 mm thick. Square patterns A and B (equally shaped) are formed at both ends of the calibration sheet 31 in the longer direction. Each pattern has an outside diameter of 900 mm.

It is preferable that a material for the calibration sheet 31 hardly contract and expand with temperature or humidity (so as not to affect the calibration). Specifically, the material is preferably cloth made of hardly expansible and contractable chemical fiber.

Patterns A and B mentioned above are colored by printing or the like on the surface or the like of the cloth used for the calibration sheet 31. Patterns A and B are provided with white square calibration marks 33 and 35, in each which a 500-mm square is placed at the center of a black square (base mark), for example. In other words, black square frames 34 and 36 are formed to surround the white square calibration marks 33 and 35.

The black-white contrast enables a publicly known image process to detect the four apexes CT (edges) of the calibration mark 33, 35 based on a luminance difference in the image data of the pattern A, B. In consideration of the contrast, for example, a red color is used for an intermediate part between patterns A and B. While there have been described the frames 34 and 36 in black and the intermediate part 37 in red, both may be provided in the same color as black or red.

Rod-like weights (end weights) 39 and 41, each 950 mm long, are provided at the ends of the calibration sheet 31 in the axial direction, namely, along the outer sides (shorter sides) in the axial direction of patterns A and B.

The end weights 39 and 41 prevent misalignment of the calibration sheet 31 when placed. For this purpose, the end weights 39 and 41 may be advantageously made of resin (e.g., ABS) or metal (e.g., iron) heavy enough to resist an effect of wind.

The calibration sheet 31 not only may be provided as a sheet but also may be painted on a road if patterns A and B conform to a specified size.

Patterns A and B just need to be used to find apexes CT of the calibration marks 33 and 35. Patterns A and B are not limited to be square but may be formed to be polygonal such as a rectangle or a triangle.

<Placement of the Calibration Sheet 31>

The description below explains placement of the calibration sheet 31.

Figure 3:
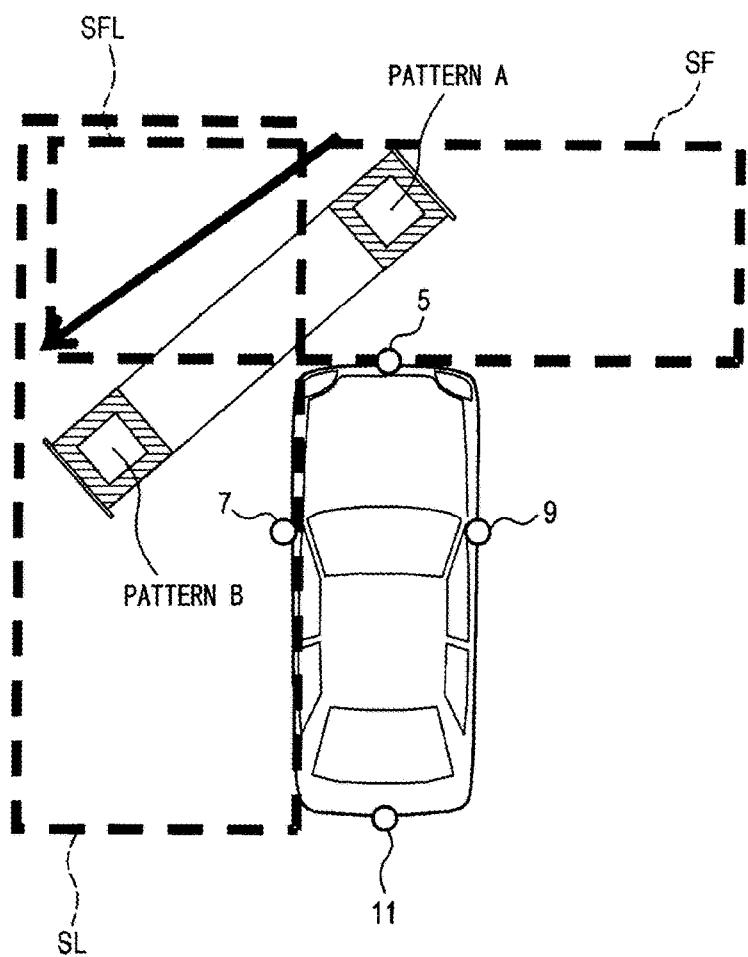
FIG. 3 is an explanatory diagram illustrating placement of a calibration sheet (viewed from above a vehicle) according to the first embodiment.

As illustrated in FIG. 3, the front camera 5 covers capture range SF (a horizontally long rectangular range indicated by the broken line in the drawing) in front of the vehicle. The left camera 7 covers capture range SL (a vertically long rectangular range indicated by the broken line in the drawing) to the left side of the vehicle. Capture ranges SF and SL partially overlap with each other (at the top left of the drawing). The description below explains a case of placing the calibration sheet 31 so as to extend across capture ranges SF and SL. An overlap between capture ranges SF and SL is referred to as overlapping range SFL.

In more detail, pattern A at one end of the calibration sheet 31 is placed in capture range SF (except overlapping range SFL). Pattern B at the other end of the calibration sheet 31 is placed in capture range SL (except overlapping range SFL).

c) The description below explains a calibration method according to the first embodiment.

For example, a signal from the diagnostic tool 27 determines which camera serves as a reference camera (that is correctly positioned or oriented and requires no calibration) and which camera serves as an adjustment-targeted camera (that requires calibration because the camera is incorrectly positioned or oriented or is replaced). The adjustment aims at adjusting a transformation rule (parameter) for the camera's projection transform. The description below is directed to an example in which the left camera 7 serves as the reference camera and the front camera 5 serves as the adjustment-targeted camera.

For example, a signal from the diagnostic tool 27 starts the calibration. The ECU 3 (e.g., image processing portion 21) corresponding to an example of an adjustment portion and an adjustment means receives the signal from the diagnostic tool 27 and executes a calibration processing program to adjust the transformation rule as described below.

Figure 4:
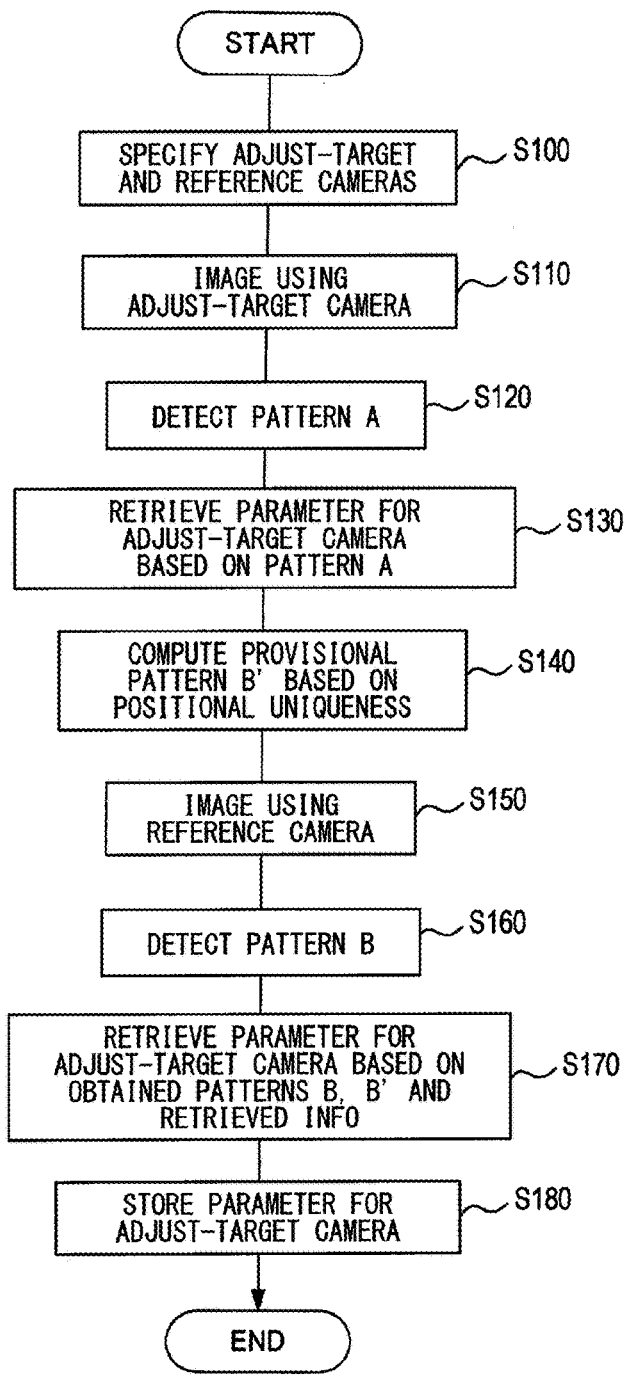
FIG. 4 is a flowchart illustrating a camera calibration method according to the first embodiment.

As illustrated in FIG. 4, the signal from the diagnostic tool 27 starts the calibration processing program. At S100, the ECU 3 acquires information about the reference camera and the adjustment-targeted camera.

At S110, the front camera 5 serving as the adjustment-targeted camera captures an image. This allows the ECU 3 to acquire image data of capture range SF of the front camera 5. The image data contains pattern A as a calibration pattern. The capture data is input to the image input signal processing portion 17.

At S120, the ECU 3 applies an image process to the image of the capture range SF, the image being captured by the front camera 5. The ECU 3 detects pattern A (in detail, pattern A as an image corresponding to actual pattern A) as described below.

This image process generates an image of an adjustment calibration pattern GA. Actual patterns GA and GB are used to refer to the image data of each pattern A and B. The same applies to the other patterns.

The image input signal processing portion 17 separates a video signal (containing the information about luminance) from the input analog signal. The image processing portion 21 converts the video signal from the analog signal to a digital signal and then detects pattern A.

Specifically, the ECU 3 uses a digitized video signal to apply publicly known distortion correction to a captured image.

Figure 5A:
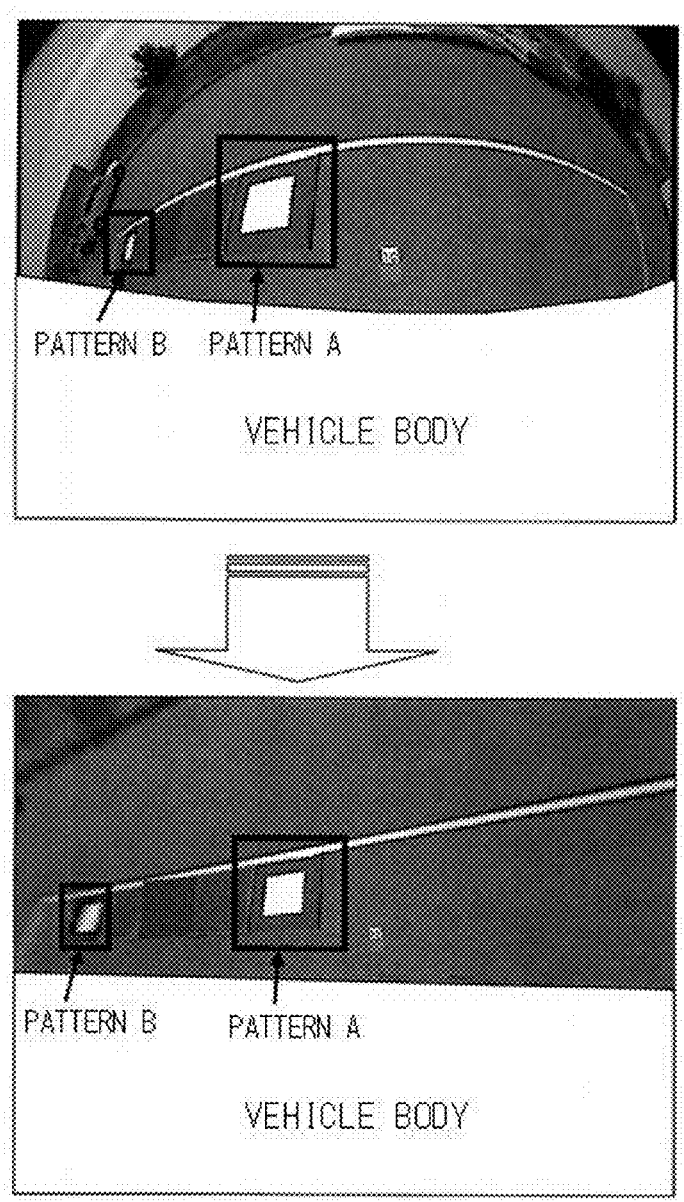
FIG. 5A is an explanatory diagram illustrating distortion correction applied to an image captured by a wide angle camera.
Figure 5B:
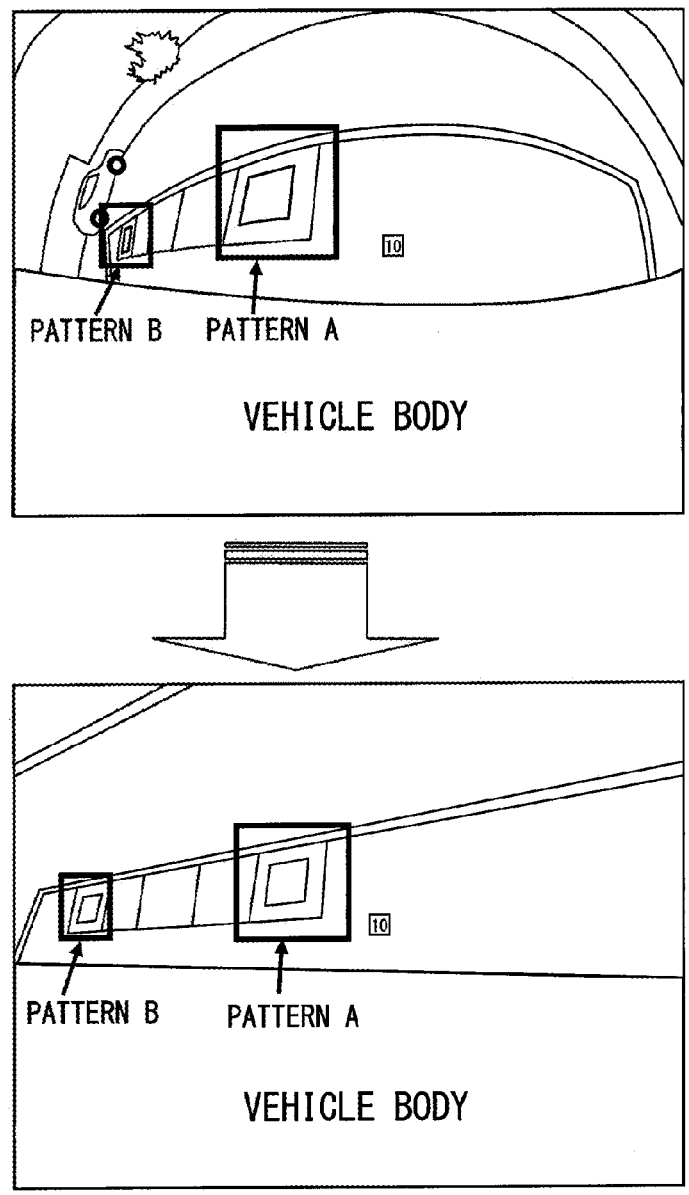
FIG. 5B is a line drawing of FIG. 5A.

An image is captured by a wide-angle lens and is therefore distorted (see upper parts of FIGS. 5A and 5B). For example, a straight line is displayed as if it were curved. The distortion needs to be corrected so that the straight line is corrected and is displayed straight (see lower parts of FIGS. 5A and 5B). The distortion correction is publicly known and a description is omitted for simplicity.

After the distortion correction, the ECU 3 compares the luminance in the video signal and detects edges corresponding to apexes CT of pattern A based on a luminance difference (an intersection between straight lines). Of the detected edges, the ECU 3 finds edges corresponding to the edges (corners) of the white graphic (calibration mark 35) enclosed by the black frame area inside pattern A. The ECU 3 detects the edges as the four apexes CT corresponding to pattern A. Subsequently, the memory 23 stores the result of detecting the four apexes CT.

At this stage, only the distortion correction is applied to the image. Normally, pattern A is not represented as a square, but as a quadrilateral such as a trapezoid.

At S130, the image processing portion 21 retrieves (computes) and corrects a parameter serving as the transformation rule for the front camera 5 based on the image data of pattern A stored in the memory 23.

Specifically, the front camera 5 uses parameters X, Y, Z, Roll, Pitch, and Yaw. The ECU 3 retrieves (computes) and corrects Roll, Pitch, and Z out of parameters so that pattern A conforms to a 500-mm square in terms of the shape and the size.

Determining Roll and Pitch determines the graphic shape. Determining Z determines the graphic size.

Figure 6:
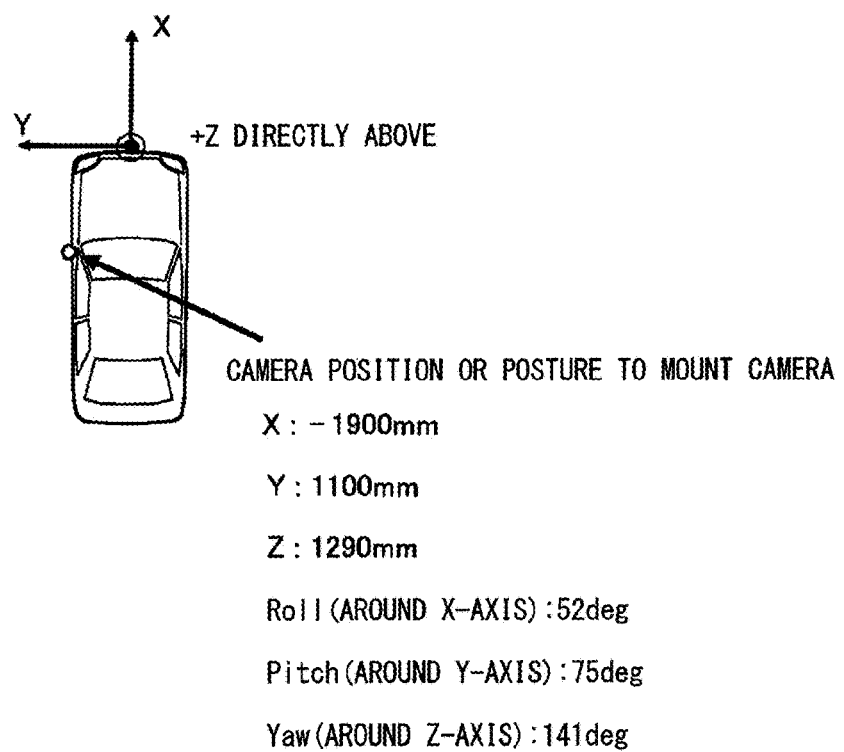
FIG. 6 is an explanatory diagram illustrating an example of a vehicle coordinate system and camera parameters.

FIG. 6 illustrates a vehicle coordinate system, namely, a coordinate system based on the reference (origin) corresponding to a point on the ground immediately below the front center of the vehicle. X denotes a distance in the X-axis direction or the front-back direction of the vehicle while the + side denotes forward. Y denotes a distance in the Y-axis direction or the right-left direction of the vehicle while the + side denotes left. Z denotes a distance in the Z-axis direction or the vertical direction while the + side denotes above. For example, the left camera 7 uses parameters in the vehicle coordinate system as illustrated in FIG. 6.

The description below explains a method of computing Roll, Pitch, and Z based on FIG. 7.

Figure 7:
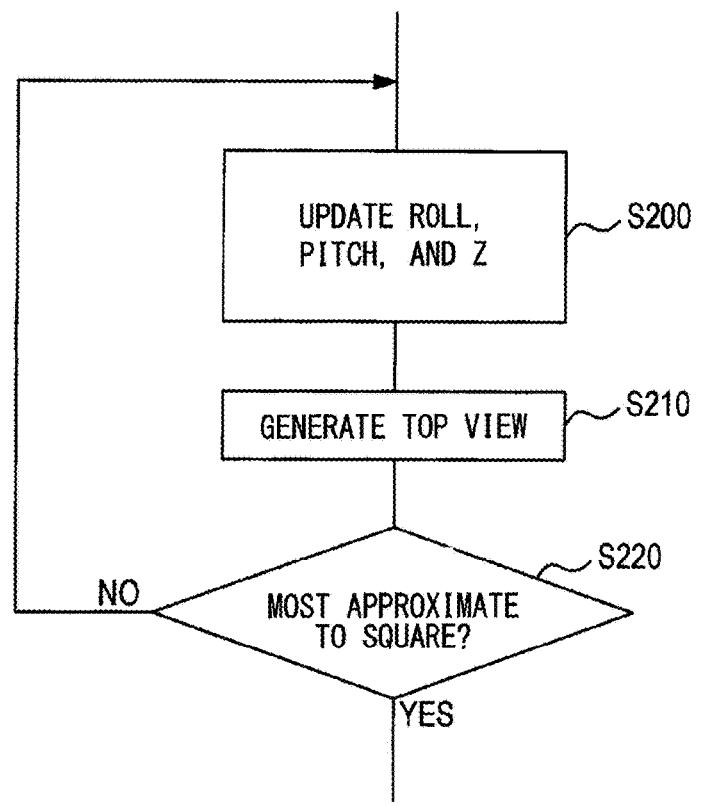
FIG. 7 is a flowchart illustrating a method of updating Roll, Pitch, and Z belonging to the calibration method according to the first embodiment.

At S200 in FIG. 7, the ECU 3 updates Roll, Pitch, and Z.

For example, the ECU 3 divides the range corresponding to each parameter into minute ranges (minute values) and sequentially updates the minute values of the parameter to update the parameter.

For example, suppose that Roll covers the range between −3 and +3 degrees around the reference value. Then, the ECU 3 sequentially changes the Roll value in increments of 0.1 degrees. The same applies to Pitch and Z.

At S210, the ECU 3 finds a projective image (bird's-eye image as a top view) from the image data using the parameters. Parameters Roll, Pitch, Z are sequentially changed. Parameters X, Y, and Yaw remain unchanged. The method of finding a projective image using the parameters is publicly known and a description is omitted for simplicity.

At S220, the ECU 3 determines whether or not pattern A (in detail, the calibration mark 35) in the projective image approximates to a square. Specifically, the ECU 3 finds a graphic most approximate to a square (an image most approximate to the image of the 500-mm square) from coordinates for the four apexes CT of the calibration mark 35 inside pattern A.

For example, the ECU 3 finds coordinates for apexes of a correct square and coordinates for apexes of the quadrilateral in the projective image. The ECU 3 equates the graphic most approximate to a square with a graphic that minimizes the total value of distances between the corresponding apexes. This method is publicly known as described in Japanese Patent No. 4555876 (see FIG. 7).

The ECU 3 repeats the process from S200 to S220 while updating the parameter values described above to find a graphic most approximate to a square. The ECU 3 identifies the parameters used to find the graphic with correct values for parameters Roll, Pitch, and Z for the front camera 5 and stores the parameter values in the memory 23.

The ECU 3 causes the memory 23 to store the coordinates for apexes CT of the calibration mark 35 in the graphic that is found as described above for pattern A and most approximates to a square.

The description returns to FIG. 4. At S130, the ECU 3 finds coordinates for apexes CT of the calibration mark 33 for provisional pattern B', from the coordinates stored in memory 23 for apexes CT of the calibration mark 35 in the graphic that are most approximate to a square for pattern A.

Because the dimensions of the calibration sheet 31 are pre-known, the ECU 3 can find coordinates for apexes CT of provisional pattern B' from the coordinates for apexes CT of pattern A and the dimensions of the calibration sheet 31.

In the description below, an apostrophe "'" follows the letter of a provisional pattern computed as a supplementary one.

At S150, the ECU 3 captures pattern B using the left camera 7 serving as the reference camera, for which the adjustment of the transformation rule is not needed.

At S160, the capture data for pattern B is input to the image input signal processing portion 17. The image processing portion 21 then detects pattern B in the same manner as detecting the pattern A. The image acquired by this image process is the reference calibration pattern GB corresponding to actual pattern B as described above.

Specifically, because pattern B is square, the ECU 3 detects four apexes CT of the square for the calibration mark 33.

The image data acquired by the reference camera is transformed into a projective image (by a correct transformation rule). Coordinate data for the projective image is coordinate data in the vehicle coordinate system.

At S170, the ECU 3 approximates provisional pattern B' to pattern B using image data for provisional pattern B' and pattern B. Namely, the ECU 3 aligns apexes CT of the calibration mark for provisional pattern B' to those for pattern B so that the apexes CT for provisional pattern B' approximate to the corresponding apexes CT for pattern B. The ECU 3 retrieves (computes) and corrects parameters for the front camera 5 so as to minimize a positional error.

The ECU 3 retrieves (computes) and corrects Yaw, X, and Y out of parameters X, Y, Z, Roll, Pitch, and Yaw so as to minimize a positional error (i.e., the total of distances between the corresponding apexes CT) by adjusting the orientation and the position of provisional pattern B'.

The method of computing Yaw, X, and Y is similar to the method of computing Z, Roll, and Pitch illustrated in FIG. 7.

Determining Yaw, X, and Y can determine the position and the rotation angle of a graphic on the plane.

The method of minimizing a positional error between two corresponding graphics is publicly known and a description is omitted for simplicity. The method is detailed in Japanese Patent No. 4555876, for example.

At S180, the parameters X, Y, Z, Roll, Pitch, and Yaw after the retrieval (computation) for the front camera 5 are stored in the memory 23 by the ECU 3. Then the processing is ended.

This enables to confirm that the adjustment using the parameters after adjusting the front camera 5 has been correctly made.

Specifically, images captured by the front camera 5, the left camera 7, the right camera 9, and the rear camera 11 are first input to the image input signal processing portion 17. The image processing portion 21 then transforms the images captured by the four cameras into a projective image and combines them in a single image space (a space in the vehicle coordinate system). The image output signal processing portion 25 converts the projective image data into an analog signal and outputs the signal. The display apparatus 13 displays the signal so that the image can be confirmed.

The memory 23 stores necessary information during processes in the ECU 3. The image processing portion 21 sequentially processes the information using the memory 23.

A shift position, a vehicle speed, and a steering angle input to the input signal processing portion 19 can determine from which viewpoint the space should be displayed on the screen. When the vehicle travels at a low speed, for example, a top view screen is selected to provide a bird's-eye image so that the periphery of the vehicle can be viewed from above the vehicle.

d) Effects of the embodiment will be described.

The first embodiment uses the calibration sheet 31 including two patterns A and B. Pattern A is placed in capture range SF of the front camera 5 serving as an adjustment-targeted camera. Pattern B is placed in capture range SL of the left camera 7 serving as a reference camera. Patterns A and B are not placed in overlapping range SFL between the cameras 5 and 7.

In this state, by performing the above-mentioned calibration, it is possible to adjust the front camera 5 serving as an adjustment-targeted camera.

For example, suppose that patters A and B are provided as calibration patterns based on the positional relationship in FIG. 3 and that the reference camera is the left camera 7 and the adjustment-targeted camera is the front camera 5. In this case, the left camera 7 serving as the reference camera can capture pattern B. However, the front camera 5 serving as the adjustment-targeted camera cannot capture pattern B.

However, the front camera 5 can capture pattern A. The positional relationship between patterns A and B is already known. Pattern A can be used to compute provisional pattern B' as an estimated position for pattern B. Establishing a correspondence between coordinates for provisional pattern B' and coordinates for provisional pattern B can set the parameters or change the transformation rule for the front camera 5.

Even if capture ranges for the cameras 5 and 7 do not overlap with each other, the first embodiment can easily calibrate the front camera 5 serving as an adjustment-targeted camera by placing patterns A and B in the corresponding capture ranges SF and SL and performing the above-mentioned process.

Even if a screen displays (single) pattern A (or B) to be very small as is the case in a conventional one, the first embodiment uses the calibration sheet 31 containing different patterns A and B placed in capture ranges SF and SL for the different cameras 5 and 7 to improve the accuracy for the cameras 5 and 7 to detect patterns A and B. The first embodiment can provide a technical advantage of accurately performing the calibration by performing the above-mentioned process.

According to the first embodiment, the calibration sheet 31 is provided as an elongated (rectangular) member and patterns A and B are formed at both ends in the longer direction. Patterns A and B can be easily placed in the corresponding capture ranges even if the capture ranges for the cameras are distant from each other.

According to the present embodiment, the calibration sheet 31 is made of cloth (fiber) as a material that hardly expands and contracts with temperature and humidity. The accurate calibration is always available even if the environment changes.

The calibration sheet 31 can be folded like a scroll, showing an advantage of space-saving and excellent usability.

The end weights 39 and 41 as rod-like weights are provided at both ends of the calibration sheet 31 in the longer direction (outside patterns A and B), enabling the calibration sheet 31 to be placed stably.

Materials of the weight may include resin (e.g., ABS) or metal (e.g., iron).

(Second Embodiment)

The description below explains a second embodiment, in which an explanation on contents similar to those in the first embodiment are omitted or simplified. The second embodiment uses the same reference numerals as those used for the first embodiment. The same applies to the other embodiments to be described below.

Figure 8:
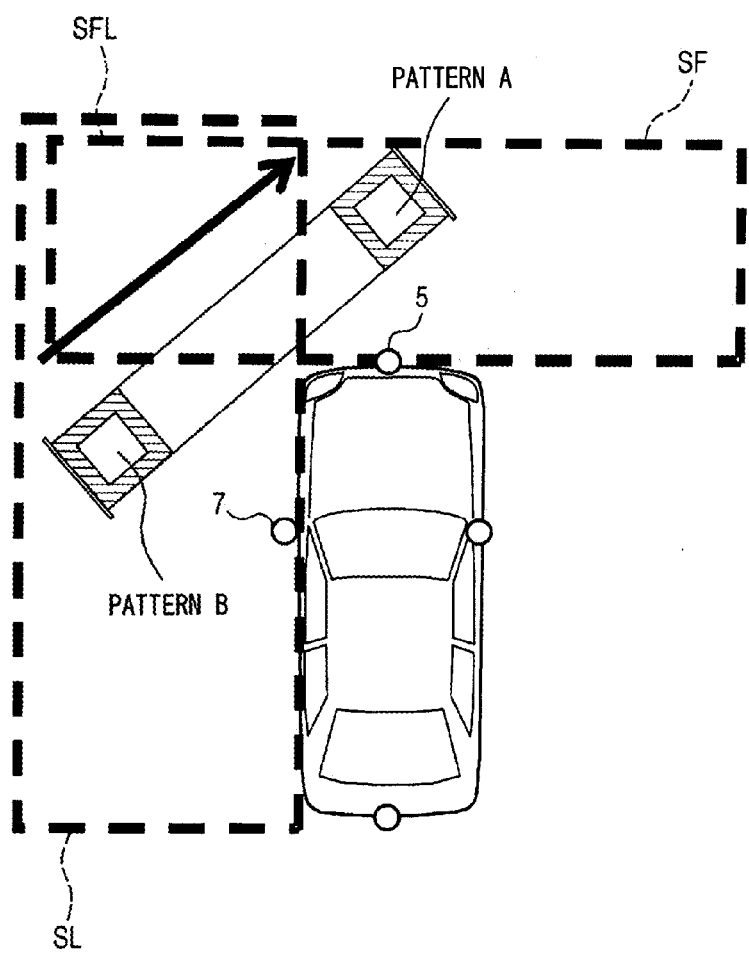
FIG. 8 is an explanatory diagram illustrating placement of a calibration sheet (viewed from above a vehicle) according to a second embodiment.

The first embodiment computes coordinates for pattern B from pattern A. As illustrated in FIG. 8, the second embodiment computes coordinates for pattern A from pattern B.

The shapes and placement of the reference camera (left camera 7), the adjustment-targeted camera (front camera 5), and the calibration sheet 31 are similar to those of the first embodiment.

Figure 9:
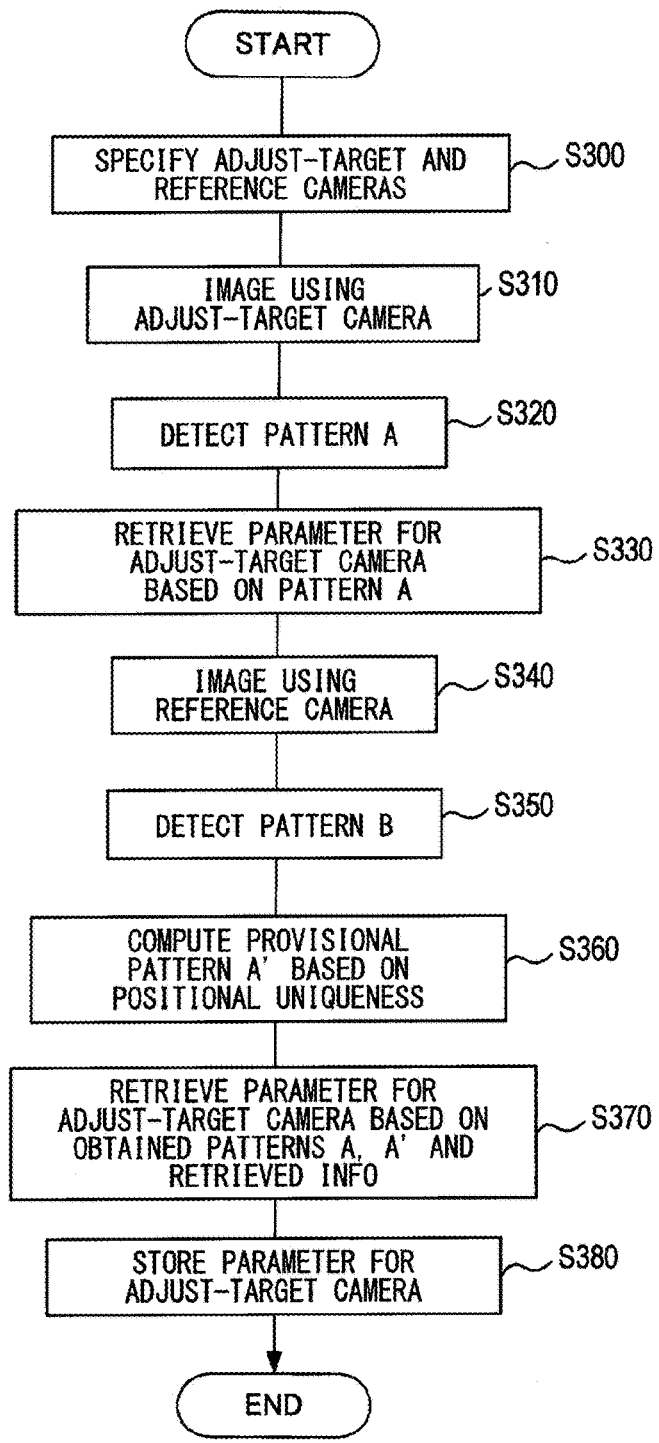
FIG. 9 is a flowchart illustrating a camera calibration method according to the second embodiment.

FIG. 9 illustrates a calibration method according to the second embodiment. At S300, the ECU 3 acquires information about the reference camera and the adjustment-targeted camera based on a signal from the diagnostic tool 27.

At S310, the ECU 3 performs the capture using the front camera 5 serving as the adjustment-targeted camera.

At S320, the ECU 3 detects pattern A similarly to S120 in the first embodiment.

At S330, similarly to S130 in the first embodiment, the ECU 3 retrieves (computes) and corrects parameters for the front camera 5 based on pattern A. Specifically, the ECU 3 retrieves (computes) and corrects Roll, Pitch, and Z out of parameters X, Y, Z, Roll, Pitch, and Yaw so that pattern A (in detail, its calibration mark 35) conforms to a 500-mm square in terms of the shape and the size.

At S340, the ECU 3 captures pattern B using the left camera 7 serving as the reference camera that need not adjust the transformation rule.

At S350, the ECU 3 detects pattern B from the captured image. Specifically, because pattern B is square, the ECU 3 detects four apexes CT of the square for the calibration mark 33.

The dimension of the calibration sheet 31 is pre-known. At S360, the ECU 3 computes coordinates for provisional pattern A' (in detail, its calibration mark) corresponding to coordinates for four apexes CT of pattern A (in detail, its calibration mark 35) from coordinates for four apexes CT of pattern B (in detail, its calibration mark 33).

At S370, the ECU 3 approximates provisional pattern A' to pattern A (specifically, approximates the calibration marks to each other). The ECU 3 retrieves (computes) and corrects parameters for the front camera 5 so as to minimize a positional error. Specifically, the ECU 3 approximates provisional pattern A' to pattern A by adjusting the orientation and the position of provisional pattern A. The ECU 3 retrieves (computes) and corrects Yaw, X, and Y out of parameters X, Y, Z, Roll, Pitch, and Yaw so as to minimize a positional error.

At S380, parameters X, Y, Z, Roll, Pitch, and Yaw after the retrieval (computation) for the front camera 5 are stored in the memory 23 by the ECU 3. Then the processing is ended.

The second embodiment provides the same advantages as the first embodiment.

(Third Embodiment)

The description below explains a third embodiment, in which an explanation on contents similar to those in the first embodiment is omitted or simplified.

Figure 10:
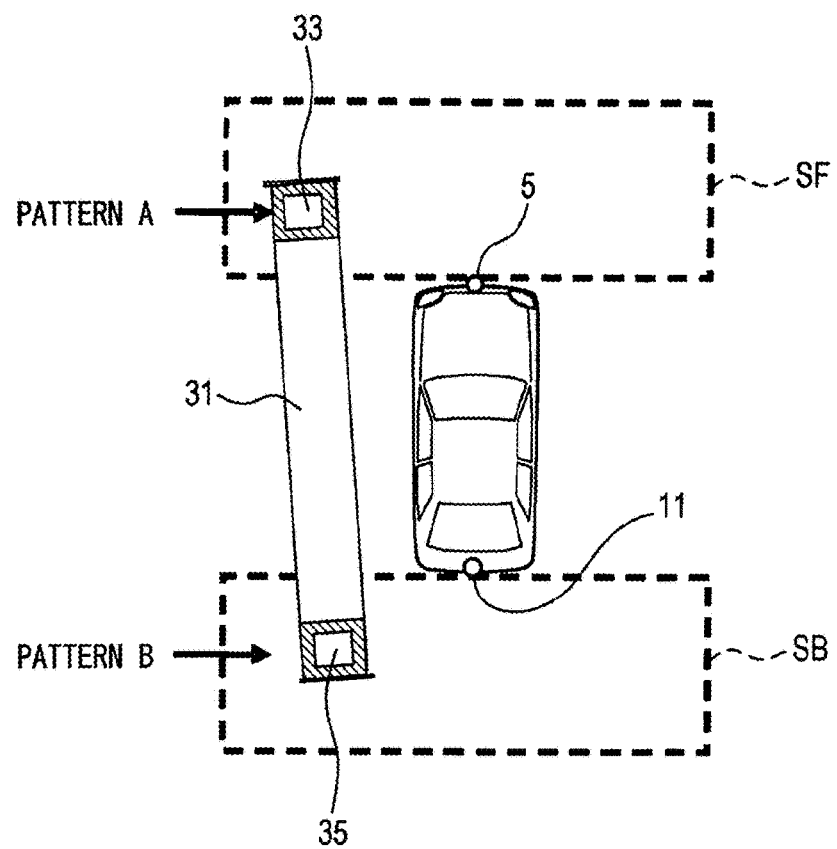
FIG. 10 is an explanatory diagram illustrating placement of a calibration sheet (viewed from above a vehicle) according to a third embodiment.

In the third embodiment, as illustrated in FIG. 10, the capture range of an adjustment-targeted camera compliant with the transformation rule is not adjacent to but is distant from the capture range of a reference camera, for which the adjustment is not needed. The description below explains a case in which the calibration sheet 31 is placed so as to connect the capture ranges that do not overlap with each other. In this example, the adjustment-targeted camera is the front camera 5. The reference camera is the rear camera 11.

The description below explains a calibration method according to the third embodiment in order.

As illustrated in FIG. 10, the calibration sheet 31 is placed on the ground. Specifically, pattern A of the calibration sheet 31 is placed in capture range SF for the front camera 5. Pattern B is placed in capture range SB for the rear camera 11.

Similarly to the first embodiment, the ECU 3 causes the front camera 5 to capture pattern A of the calibration sheet 31.

The ECU 3 detects pattern A from the captured image similarly to the first embodiment. Namely, the ECU 3 detects apexes CT of the calibration mark 35 in pattern A.

Similarly to the first embodiment, the ECU 3 retrieves (computes) and corrects parameters for the front camera 5 based on pattern A. Specifically, the ECU 3 retrieves (computes) and corrects Roll, Pitch, and Z out of parameters X, Y, Z, Roll, Pitch, and Yaw so that pattern A (in detail, its calibration mark 35) conforms to a 500-mm square in terms of the shape and the size.

Similarly to the first embodiment, the ECU 3 computes provisional pattern B' (in detail, its calibration mark) corresponding to pattern B (in detail, its calibration mark 33) from four apexes CT of pattern A (in detail, its calibration mark 35) using the dimensions of the calibration sheet 31.

Similarly to the first embodiment, the ECU 3 causes the rear camera 11 serving as the reference camera to capture pattern B.

Similarly to the first embodiment, the ECU 3 detects pattern B from the captured image. Specifically, because pattern B (and the calibration mark 33) is square, the ECU 3 detects four apexes CT of the square for the calibration mark 35.

Similarly to the first embodiment, the ECU 3 approximates provisional pattern B' to pattern B (specifically, approximates the corresponding calibration marks to each other). The ECU 3 retrieves (computes) and corrects parameters for the front camera 5 so as to minimize a positional error.

Specifically, the ECU 3 approximates provisional pattern B' to pattern B (in detail, its calibration mark) by adjusting the orientation and the position of provisional pattern B' (in detail, its calibration mark). The ECU 3 retrieves (computes) and corrects Yaw, X, and Y out of parameters X, Y, Z, Roll, Pitch, and Yaw so as to minimize a positional error.

Parameters X, Y, Z, Roll, Pitch, and Yaw after the retrieval (computation) for the front camera 5 are stored by the ECU 3.

The third embodiment provides the same advantages as the first embodiment.

In particular, the third embodiment provides an advantage of being able to adjust the front camera 5 or the rear camera 11 even if the side camera 7 or 9 is unavailable. Easy adjustment is available even if the capture ranges do not overlap and separate from each other.

(Fourth Embodiment)

The description below explains a fourth embodiment, in which an explanation on contents similar to those in the first embodiment is omitted or simplified.

Figure 11:
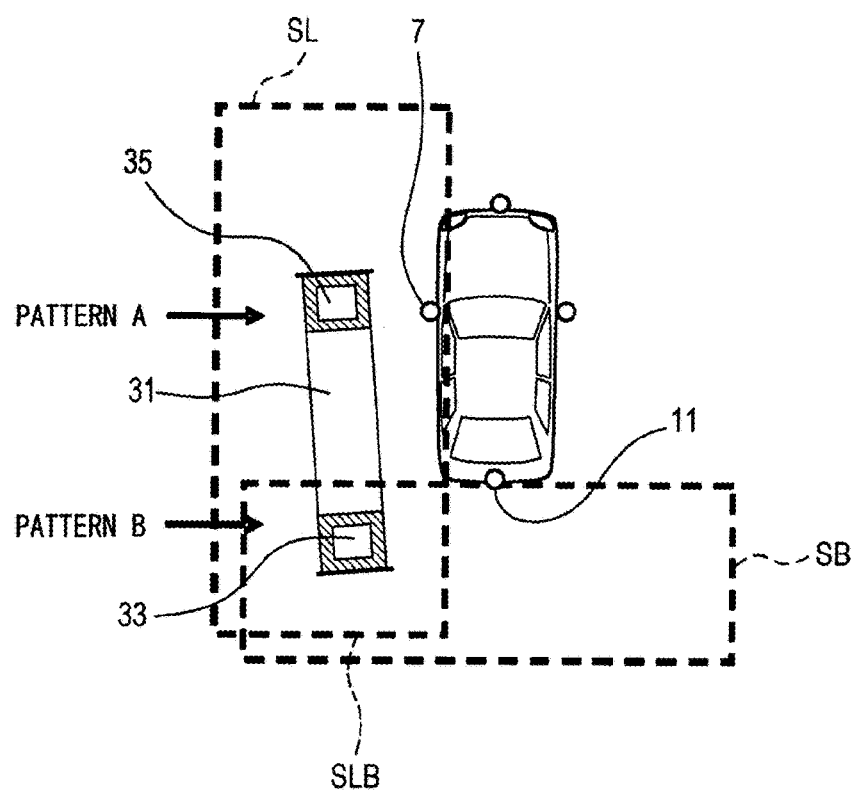
FIG. 11 is an explanatory diagram illustrating placement of a calibration sheet (viewed from above a vehicle) according to a fourth embodiment.

In the fourth embodiment, as illustrated in FIG. 11, the capture range of an adjustment-targeted camera compliant with the transformation rule partially overlaps with the capture range of a reference camera requiring no adjustment. In this example, the adjustment-targeted camera is the left camera 7. The reference camera is the rear camera 11.

Figure 12A:
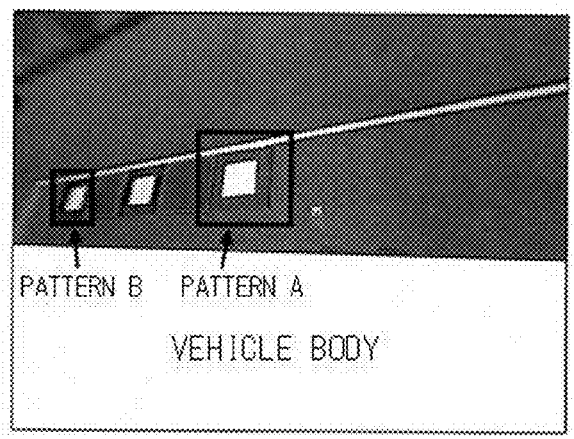
FIG. 12A illustrates an image resulting from applying distortion correction to an image captured by a left camera according to the fourth embodiment.
Figure 12B:
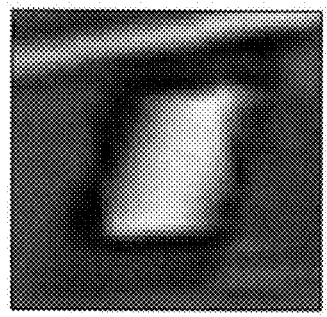
FIG. 12B illustrates an image resulting from enlarging an area corresponding to pattern A in FIG. 12A.
Figure 12C:
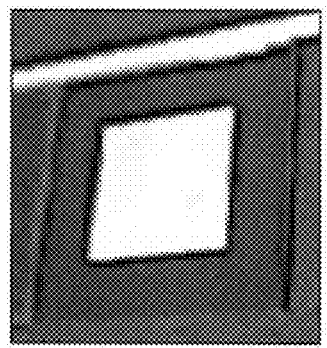
FIG. 12C illustrates an image resulting from enlarging an area corresponding to pattern B in FIG. 12A.
Figure 12D:
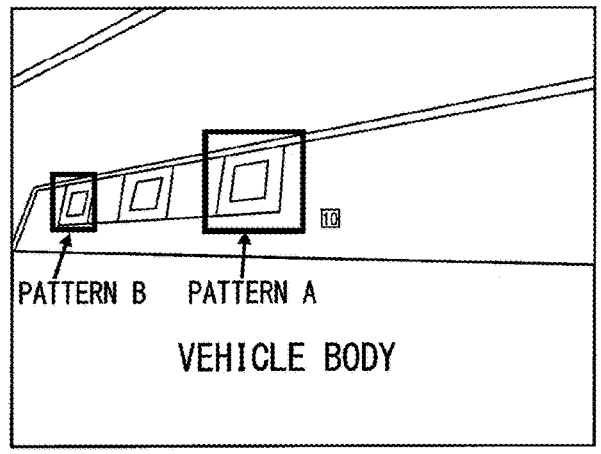
FIG. 12D is a line drawing of FIG. 12A.
Figure 12E:
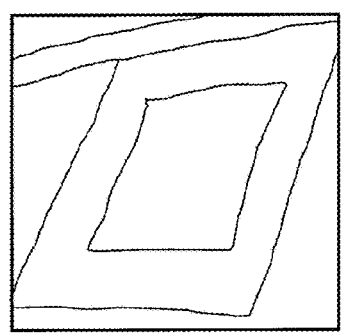
FIG. 12E is a line drawing of FIG. 12B.

Particularly, the left camera 7, when positioned as illustrated in FIG. 11, captures an image of pattern B to be displayed very small as illustrated in FIGS. 12A and 12D that represent images after the distortion correction. As illustrated in FIGS. 12B and 12E, pattern B is defocused even if the distortion correction is performed. Apexes CT cannot be detected accurately. However, the fourth embodiment accurately detects apexes CT using the method described below.

Figure 12F:
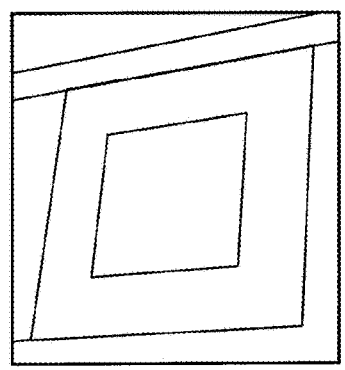
FIG. 12F is a line drawing of FIG. 12C.

As will be described later, the fourth embodiment enables pattern A to be sufficiently large as illustrated in FIGS. 12C and 12F. Because displayed images are clear and the dimensions of the calibration sheet 31 are pre-known, the position of pattern B can be computed from the position of pattern A.

The description below explains a calibration method according to the fourth embodiment in order.

As illustrated in FIG. 11, the calibration sheet 31 is placed on the ground. Specifically, pattern A of the calibration sheet 31 is placed in capture range SL for the left camera 7. Pattern B is placed in capture range SB for the rear camera 11. Pattern B is placed not to enter overlapping range SLB between capture range SL for the left camera 7 and capture range SB for the rear camera 11. Pattern B is placed to enter overlapping range SLB.

Similarly to the first embodiment (but using the different camera), the ECU 3 causes the left camera 7 to capture pattern A of the calibration sheet 31.

The ECU 3 detects pattern A from the captured image similarly to the first embodiment. Namely, the ECU 3 detects apexes CT of the calibration mark 35 in pattern A.

Similarly to the first embodiment, the ECU 3 retrieves (computes) and corrects parameters for the left camera 7. Specifically, the ECU 3 retrieves (computes) and corrects Roll, Pitch, and Z out of parameters X, Y, Z, Roll, Pitch, and Yaw so that pattern A (in detail, its calibration mark 35) conforms to a 500-mm square in terms of the shape and the size.

Similarly to the first embodiment, the ECU 3 computes provisional pattern B' (in detail, its calibration mark) corresponding to pattern B (in detail, its calibration mark 33) from four apexes CT of pattern A (in detail, its calibration mark 35) using the dimensions of the calibration sheet 31.

Similarly to the first embodiment, the ECU 3 causes the rear camera 11 serving as the reference camera to capture pattern B.

Similarly to the first embodiment, the ECU 3 detects pattern B from the captured image. Specifically, because pattern B (and the calibration mark 33) is square, the ECU 3 detects four apexes CT of the square for the calibration mark 35.

Similarly to the first embodiment, the ECU 3 approximates pattern B' to pattern B (specifically, approximates the corresponding calibration marks to each other). The ECU 3 retrieves (computes) and corrects parameters for the left camera 7 so as to minimize a positional error.

Specifically, the ECU 3 approximates pattern B' to pattern B (in detail, its calibration mark 33) by adjusting the orientation and the position of pattern B' (in detail, its calibration mark). The ECU 3 retrieves (computes) and corrects Yaw, X, and Y out of parameters X, Y, Z, Roll, Pitch, and Yaw so as to minimize a positional error.

Parameters X, Y, Z, Roll, Pitch, and Yaw after the retrieval (computation) for the left camera 7 are stored by the ECU 3.

Similarly to the first embodiment, the fourth embodiment can also appropriately calibrate the left camera 7 serving as an adjustment-targeted camera.

In the fourth embodiment, pattern A is advantageously sufficiently large even if the left camera 7 inaccurately captures pattern B. Displayed images are clear. The dimensions of the calibration sheet 31 are pre-known. Therefore, the position of pattern B can be easily computed from the position of pattern A.

The fourth embodiment places pattern B in overlapping range SLB between the left camera 7 and the rear camera 11. Similarly to the first embodiment, however, pattern B may be calibrated by placing pattern B in capture range SB with which the rear camera 11 does not overlap.

(Fifth Embodiment)

The description below explains a fifth embodiment, in which an explanation on contents similar to those in the first embodiment is omitted or simplified.

Figure 13:
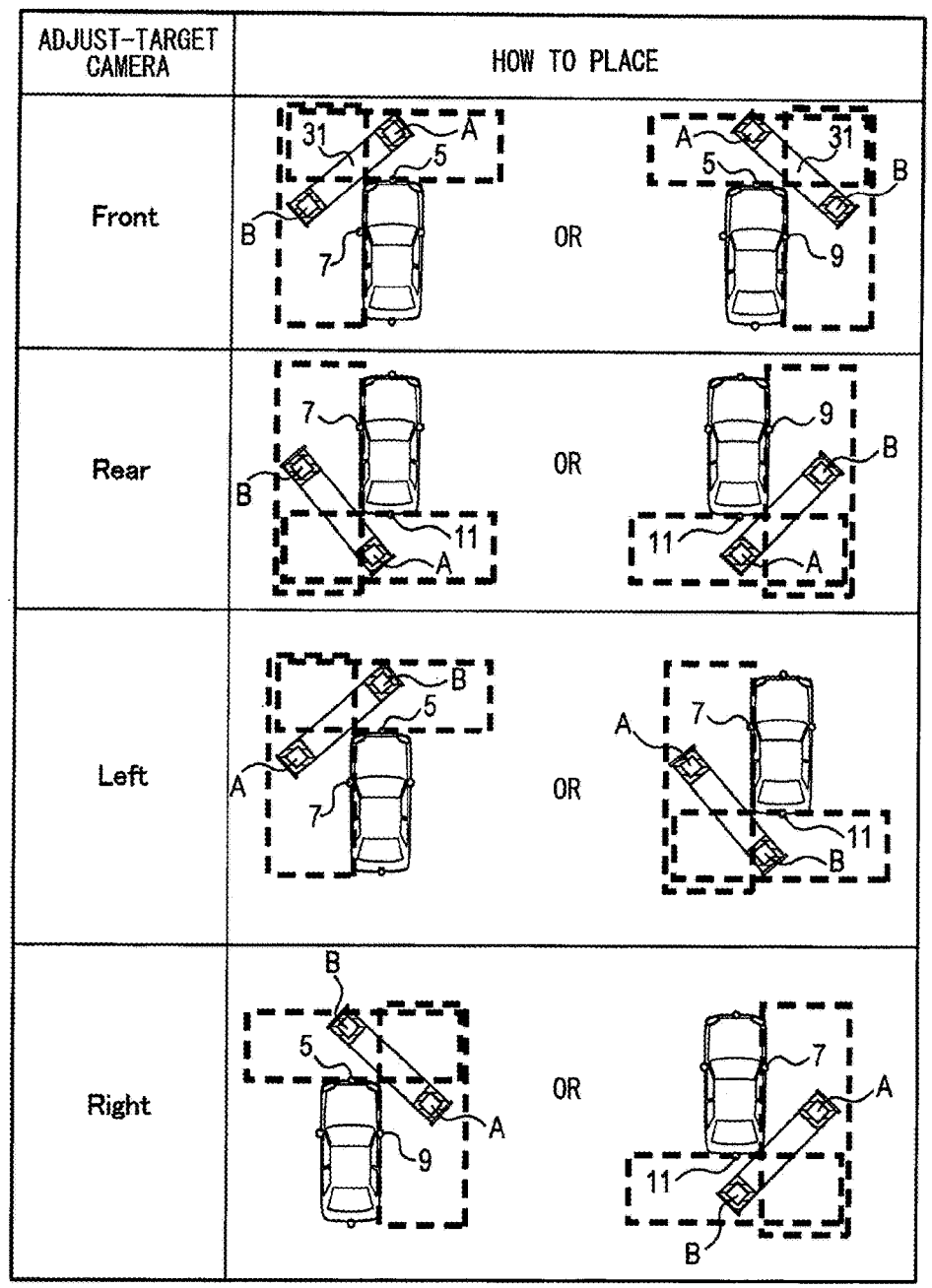
FIG. 13 is an explanatory diagram illustrating an example of placement of a calibration sheet (viewed from above a vehicle) according to a fifth embodiment.

This embodiment collectively explains a method of calibrating one through three cameras by changing positions of the single calibration sheet 31 as illustrated in FIG. 13.

a) The description below first explains an example of placing the calibration sheet 31 when the front camera 5 is used as an adjustment-targeted camera. The other cameras are used as reference cameras.

As illustrated on the left of the front row in FIG. 13, pattern A is placed in the capture range for the front camera 5 where the capture range does not overlap with the capture range for the left camera 7. Pattern B is placed in the capture range for the left camera 7 where the capture range does not overlap with the capture range for the front camera 5.

As illustrated on the right of the front row in FIG. 13, pattern A is placed in the capture range for the front camera 5 where the capture range does not overlap with the capture range for the right camera 9. Pattern B is place in the capture range for the right camera 9 where the capture range does not overlap with the capture range for the front camera 5.

Similarly to the first embodiment, the ECU 3 performs the calibration using data for patterns A and B.

b) The description below explains an example of placing the calibration sheet 31 when the rear camera 11 is used as an adjustment-targeted camera. The other cameras are used as reference cameras.

As illustrated on the left of the rear row in FIG. 13, pattern B is placed in the capture range for the left camera 7 where the capture range does not overlap with the capture range for the rear camera 7. Pattern A is place in the capture range for the rear camera 11 where the capture range does not overlap with the capture range for the left camera 7.

As illustrated on the right of the rear row in FIG. 13, pattern B is placed in the capture range for the right camera 9 where the capture range does not overlap with the capture range for the rear camera 11. Pattern A is place in the capture range for the rear camera 11 where the capture range does not overlap with the capture range for the right camera 9.

Similarly to the first embodiment, the ECU 3 performs the calibration using data for patterns A and B.

c) The description below explains an example of placing the calibration sheet 31 when the left camera 7 is used as an adjustment-targeted camera. The other cameras are used as reference cameras.

As illustrated on the left of the left row in FIG. 13, pattern B is placed in the capture range for the front camera 5 where the capture range does not overlap with the capture range for the left camera 7. Pattern A is place in the capture range for the left camera 7 where the capture range does not overlap with the capture range for the front camera 5.

As illustrated on the right of the left row in FIG. 13, pattern A is placed in the capture range for the left camera 7 where the capture range does not overlap with the capture range for the rear camera 11. Pattern B is place in the capture range for the rear camera 11 where the capture range does not overlap with the capture range for the left camera 7.

Similarly to the first embodiment, the ECU 3 performs the calibration using data for patterns A and B.

d) The description below explains an example of placing the calibration sheet 31 when the right camera 9 is used as an adjustment-targeted camera. The other cameras are used as reference cameras.

As illustrated on the left of the right row in FIG. 13, pattern B is placed in the capture range for the front camera 5 where the capture range does not overlap with the capture range for the right camera 9. Pattern A is place in the capture range for the right camera 9 where the capture range does not overlap with the capture range for the front camera 5.

As illustrated on the right of the right row in FIG. 13, pattern A is placed in the capture range for the right camera 9 where the capture range does not overlap with the capture range for the rear camera 11. Pattern B is place in the capture range for the rear camera 11 where the capture range does not overlap with the capture range for the right camera 9.

Similarly to the first embodiment, the ECU 3 performs the calibration using data for patterns A and B.

e) When two adjustment-targeted cameras are available, the ECU 3 can calibrate each adjustment-targeted camera using the reference camera adjacent to each adjustment-targeted camera similarly to the first embodiment.

f) When three adjustment-targeted cameras are available, the ECU 3 can sequentially calibrate each adjustment-targeted camera using one reference camera similarly to the first embodiment.

For example, suppose that the front camera 5 is used as the reference camera and the left camera 7, the right camera 9, and the rear camera 11 are used as adjustment-targeted cameras. In such a case, for example, the ECU 3 calibrates the left camera 7 using the front camera 5. This changes the left camera 7 to the reference camera.

The ECU 3 calibrates the rear camera 11 using the left camera 7 serving as the reference camera.

The ECU 3 calibrates the right camera 9 using the rear camera 11 serving as the reference camera.

This can calibrate three adjustment-targeted cameras.

(Sixth Embodiment)

The description below explains a sixth embodiment, in which an explanation on contents similar to those in the first embodiment is omitted or simplified.

The sixth embodiment describes a calibration method used when all the cameras are adjustment-targeted cameras that require adjusting the transformation rule for projection transform. This may occur when, for example, all the four cameras are replaced or the ECU 3 is replaced.

a) The description below explains a method of placing the calibration sheet 31.

Figure 14:
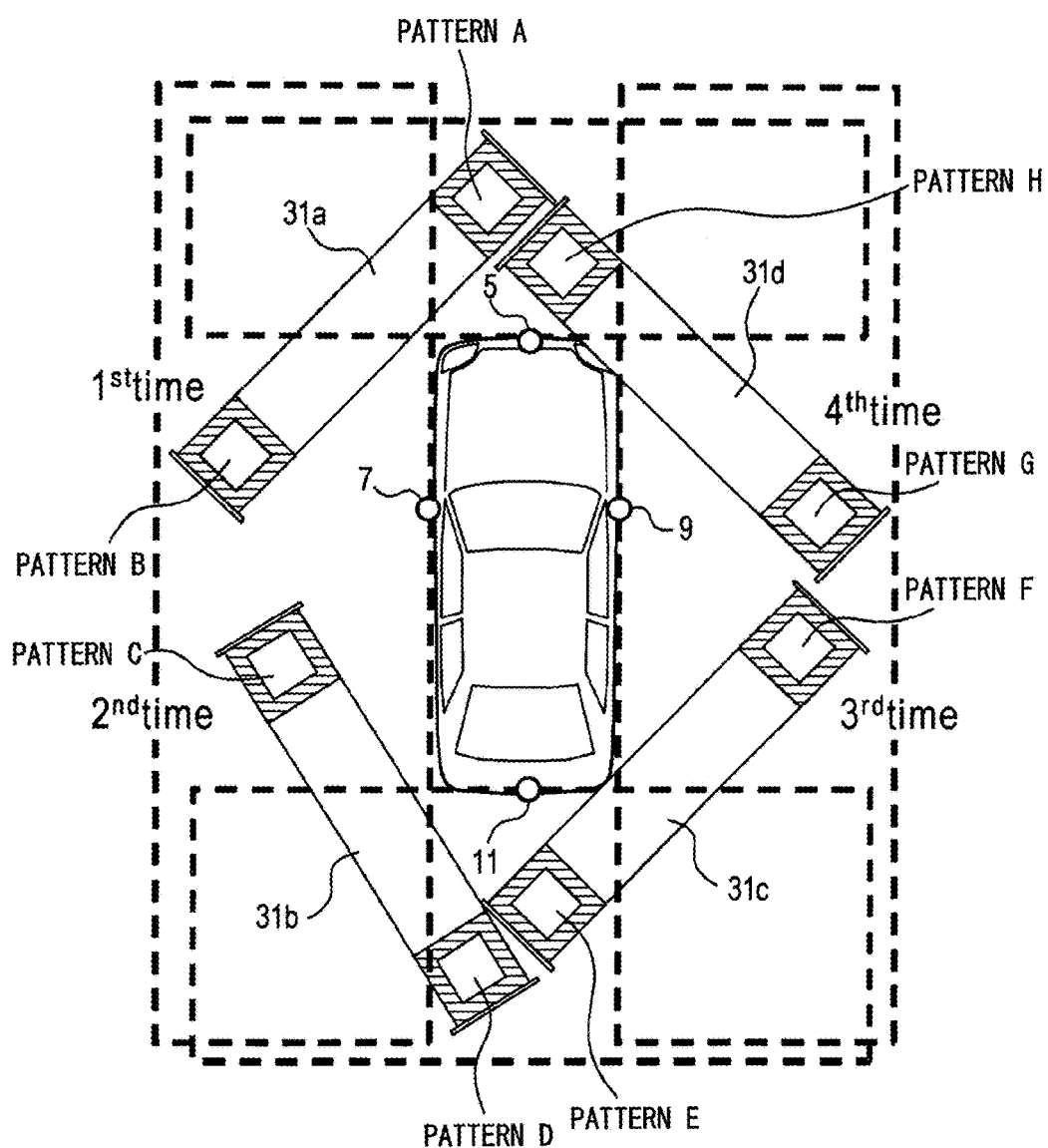
FIG. 14 is an explanatory diagram illustrating placement of a calibration sheet (viewed from above a vehicle) according to a sixth embodiment.

As illustrated in FIG. 14, the sixth embodiment places the four calibration sheets 31 (first through fourth calibration sheets 31*a* through 31*d*).

The four calibration sheets 31 are placed, so that defocusing due to calibration patterns A through H distanced too far from optical axes of the cameras 5 through 11 does not occur.

Firstly (1st time), pattern A of the first calibration sheet 31*a* is placed only in capture range SF for the front camera 5 outside an overlap between capture ranges SF and SL for the front camera 5 and the left camera 7 (i.e., outside the capture ranges for the other cameras). Pattern B of the first calibration sheet 31*a* is placed only in capture range SL for the left camera 7 outside an overlap between capture ranges SF and SL for the front camera 5 and the left camera 7.

Secondly (2nd time), pattern C (similar to pattern A) of the second calibration sheet 31*b* is placed only in capture range SL for the left camera 7 outside an overlap between capture ranges SL and SB for the left camera 7 and the rear camera 11. Pattern D (similar to pattern B) of the second calibration sheet 31*b* is placed only in capture range SB for the rear camera 11 outside an overlap between capture ranges SL and SB for the left camera 7 and the rear camera 11.

Thirdly (3rd time), pattern E (similar to pattern A) of the third calibration sheet 31*c* is placed only in capture range SB for the rear camera 11 outside an overlap between capture ranges SB and SR for the rear camera 11 and the right camera 9. Pattern F (similar to pattern B) of the third calibration sheet 31*c* is placed only in capture range SR for the right camera 9 outside an overlap between capture ranges SB and SR for the rear camera 11 and the right camera 9.

Lastly (4th time), pattern G (similar to pattern A) of the fourth calibration sheet 31*d* is placed only in capture range SR for the right camera 9 outside an overlap between capture ranges SR and SF for the right camera 9 and the front camera 5. Pattern H (similar to pattern B) of the fourth calibration sheet 31*d* is placed only in capture range SF for the front camera 5 outside an overlap between capture ranges SR and SF for the right camera 9 and the front camera 5.

The sixth embodiment places the calibration sheets 31 in the above-mentioned order for illustrative purposes. However, the order may be changed.

b) The description below explains a calibration method according to the sixth embodiment.

Figure 15A:
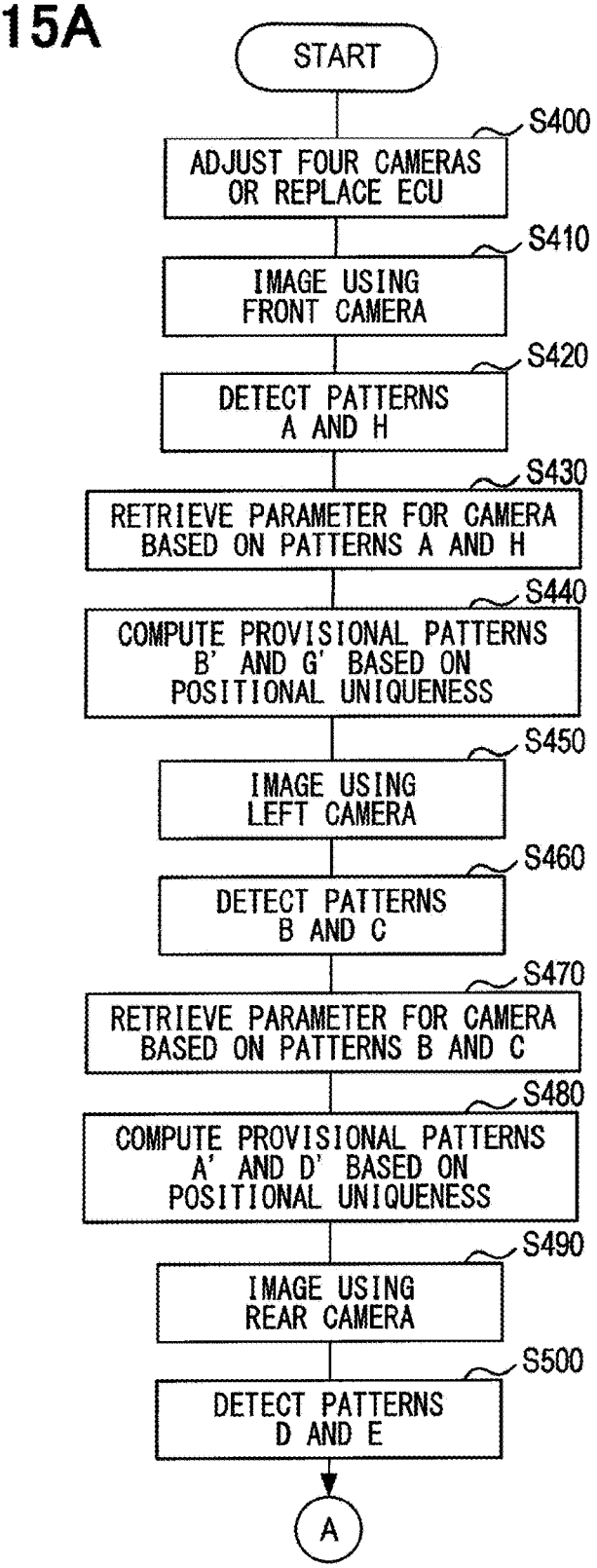
FIG. 15A is a flowchart illustrating the first half of the camera calibration method according to the sixth embodiment.
Figure 15B:
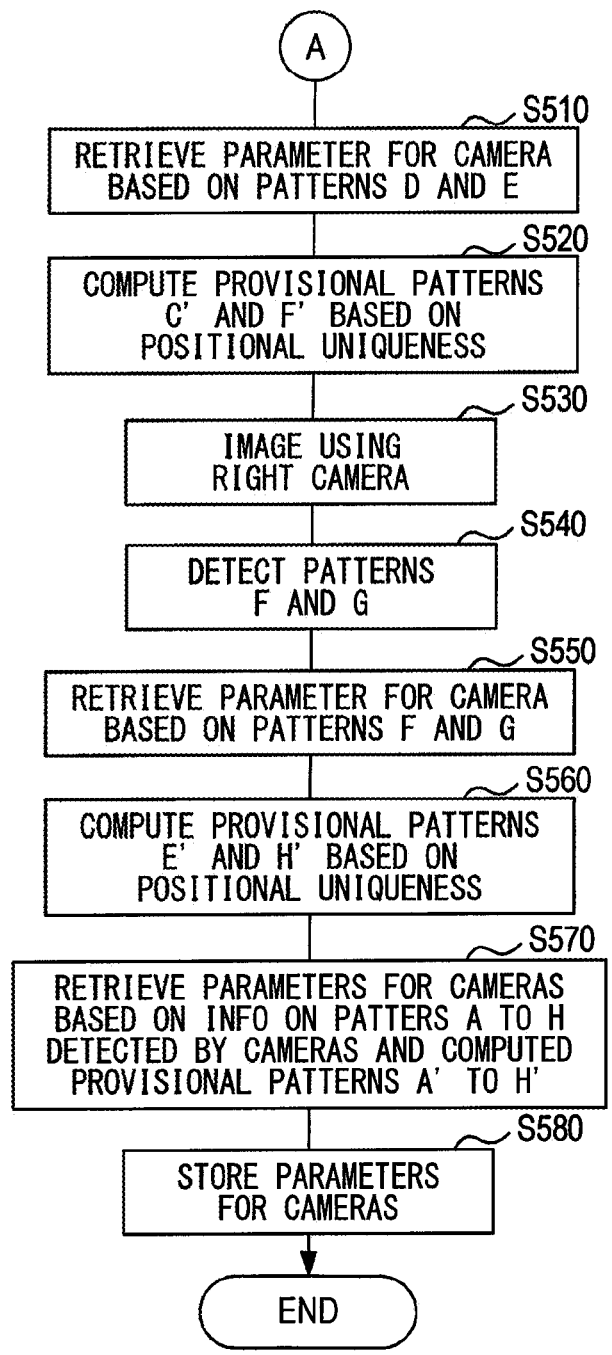
FIG. 15B is a flowchart illustrating the second half of the camera calibration method according to the sixth embodiment.

The description below explains a case of capturing images in the order of the front camera 5, the left camera 7, the rear camera 11, and the right camera 9 though the order is not limited to this, At S400, as illustrated in FIGS. 15A and 15B, the ECU 3 receives an instruction to calibrate all the four cameras 5 through 11 based on a signal from the diagnostic tool 27.

At S410, the ECU 3 causes the front camera 5 to capture pattern A for the first calibration sheet 31*a* and pattern H for the fourth calibration sheet 31*d*.

At S420, the ECU 3 detects patterns A and H from the captured images similarly to the first embodiment.

At S430, the ECU 3 retrieves (computes) and corrects parameters for the front camera 5 based on patterns A and H similarly to the first embodiment.

Specifically, the ECU 3 retrieves (computes) and corrects Roll, Pitch, and Z out of parameters X, Y, Z, Roll, Pitch, and Yaw so that patterns A and H (in detail, their calibration patterns) each conform to a 500-mm square in terms of the shape and the size.

The dimensions of the first calibration sheet 31*a* and the fourth calibration sheet 31*d* are pre-known. At S440, the ECU 3 computes coordinates corresponding to four apexes of patterns B and G (in detail, their calibration patterns) as squares from coordinates for patterns A and H (in detail, their calibration patterns) as squares. Namely, the ECU 3 computes the coordinates as provisional pattern B' and provisional pattern G' (in detail, their calibration patterns).

At S450, the ECU 3 causes the left camera 7 to capture patterns B and C.

At S460, similarly to S420, the ECU 3 detects patterns B and C.

At S470, similarly to S430, the ECU 3 retrieves (computes) and corrects parameters for the left camera 7 based on patterns B and C.

Specifically, the ECU 3 retrieves (computes) and corrects Roll, Pitch, and Z out of parameters X, Y, Z, Roll, Pitch, and Yaw so that patterns B and C (in detail, their calibration patterns) each conform to a 500-mm square in terms of the shape and the size.

The dimensions of the first calibration sheet 31*a* and the second calibration sheet 31*b* are pre-known. At S480, the ECU 3 computes coordinates corresponding to four apexes of patterns A and D (in detail, their calibration patterns) as squares from coordinates for four apexes of patterns B and C (in detail, their calibration patterns) as squares. Namely, the ECU 3 computes the coordinates as provisional pattern A' and provisional pattern D' (in detail, their calibration patterns).

At S490, the ECU 3 allows the rear camera 11 to capture patterns D and E.

At S500, similarly to S420, the ECU 3 detects patterns D and E.

At S510, the ECU 3 retrieves (computes) and corrects parameters for the rear camera 11 based on patterns D and E.

Specifically, the ECU 3 retrieves (computes) and corrects Roll, Pitch, and Z out of parameters X, Y, Z, Roll, Pitch, and Yaw so that patterns D and E (in detail, their calibration patterns) each conform to a 500-mm square in terms of the shape and the size.

The dimensions of the second calibration sheet 31*b* and the third calibration sheet 31*c* are pre-known. At S520, the ECU 3 computes coordinates corresponding to four apexes of patterns C and F (in detail, their calibration patterns) as squares from coordinates for four apexes of patterns D and E (in detail, their calibration patterns) as squares. Namely, the ECU 3 computes the coordinates as provisional pattern C' and provisional pattern F' (in detail, their calibration patterns).

At S530, the ECU 3 causes the right camera 9 to capture patterns F and G.

At S540, similarly to S420, the ECU 3 detects patterns F and G.

At S550, the ECU 3 retrieves (computes) and corrects parameters for the right camera 9 based on patterns F and G.

Specifically, the ECU 3 retrieves (computes) and corrects Roll, Pitch, and Z out of parameters X, Y, Z, Roll, Pitch, and Yaw so that patterns F and G (in detail, their calibration patterns) each conform to a 500-mm square in terms of the shape and the size.

The dimensions of the third calibration sheet 31*c* and the fourth calibration sheet 31*d* are pre-known. At S560, the ECU 3 computes coordinates corresponding to four apexes of patterns E and H (in detail, their calibration patterns) as squares from coordinates for four apexes of patterns F and G (in detail, their calibration patterns) as squares. Namely, the ECU 3 computes the coordinates as provisional pattern E' and provisional pattern H' (in detail, their calibration patterns).

The sixth embodiment computes coordinates for four apexes of a square in units of two patterns. However, the coordinates may be found for each pattern one by one.

At S570, the ECU 3 approximates pattern A', pattern B', pattern C', pattern D', pattern E', pattern F', pattern G', and pattern H' (in detail, their calibration patterns) to pattern A, pattern B, pattern C, pattern D, pattern E, pattern F, pattern G, and pattern H (in detail, their calibration patterns), respectively. The ECU 3 retrieves (computes) and corrects parameters for the front camera 5, the left camera 7, the right camera 9, and the rear camera 11 so as to minimize a positional error.

Specifically, similarly to the first embodiment, the ECU 3 adjusts orientations and positions of pattern A', pattern B', pattern C', pattern D', pattern E', pattern F', pattern G', pattern H' (in detail, their calibration patterns) to approximate to pattern A, pattern B, pattern C, pattern D, pattern E, pattern F, pattern G, pattern H (in detail, their calibration patterns), respectively. The ECU 3 retrieves (computes) and corrects Yaw, X, and Y out of parameters X, Y, Z, Roll, Pitch, and Yaw for the cameras 5 through 11 so as to minimize a positional error.

For example, the correction may be performed in the order as described below.

Similarly to the first embodiment (or the second embodiment), the process of adjusting an adjacent camera using one calibration sheet 31 is sequentially repeated basically. Similarly to the first embodiment, matching coordinates for a provisional adjustment calibration pattern (e.g., pattern B') with coordinates for an adjustment calibration pattern (e.g., pattern B) may be performed. Similarly to the second embodiment, matching coordinates for a provisional reference calibration pattern (e.g., pattern A') with coordinates for a provisional reference calibration pattern (e.g., pattern A) may be performed.

The description of "in detail, its calibration pattern (or their calibration patterns)" may be omitted from the explanation below about each pattern.

Specifically, the ECU 3 first assumes the front camera 5 to be a provisional reference camera. The ECU 3 approximates pattern A' computed from pattern B to pattern A and minimizes a positional error to retrieve (compute) and correct Yaw, X, and Y for the left camera 7.

The ECU 3 assumes the left camera 7 to be a provisional reference camera. The ECU 3 approximates pattern C' computed from pattern D to pattern C and minimizes a positional error to retrieve (compute) and correct Yaw, X, and Y for the rear camera 11.

The ECU 3 assumes the rear camera 11 to be a provisional reference camera. The ECU 3 approximates pattern E' computed from pattern F to pattern E and minimizes a positional error to retrieve (compute) and correct Yaw, X, and Y for the right camera 9.

Finally, the ECU 3 assumes the right camera 9 to be a provisional reference camera. The ECU 3 approximates pattern G' computed from pattern H to pattern G and minimizes a positional error to retrieve (compute) and correct Yaw, X, and Y for the front camera 5.

The ECU 3 retrieves (computes) and corrects Yaw, X, and Y for all the four cameras 5 through 11 from the left camera 7 to the front camera 5. The ECU 3 follows the correction cycle, adjusts orientations and positions of patterns A through H, and minimizes a positional error to retrieve (compute) and correct Yaw, X, and Y for the cameras 5 through 11.

The order of the correction procedures is merely an example and is not limited thereto.

Finally, at S580, the ECU 3 causes the memory 23 to store parameters X, Y, Z, Roll, Pitch, Yaw after retrieving (computing) the front camera 5, the left camera 7, the right camera 9, and the rear camera 11 and once terminates the process.

c) The description below explains a subsequent process (post-process).

The post-process transforms the coordinate system for the four cameras 5 through 11 into the vehicle coordinate system.

Figure 16:
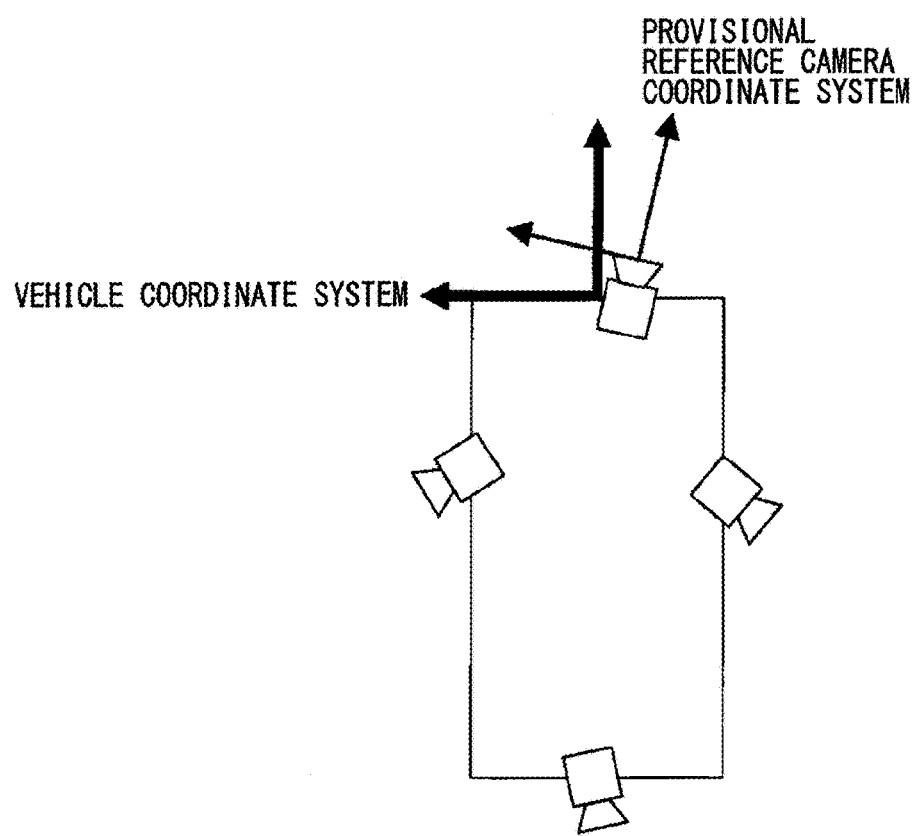
FIG. 16 is an explanatory diagram illustrating relationship between a provisional reference camera coordinate system and a vehicle coordinate system (viewed from above a vehicle)

The process from S400 to S580 adjusts parameters with reference to a provisional reference camera (such as the front camera 5). Completing the adjustment process reveals a positional relationship among the four cameras 5 through 11 with reference to the provisional reference camera. Namely, the process reveals parameters such as coordinates in a provisional reference camera coordinate system as illustrated in FIG. 16. However, the calibration aims at finding parameters in the vehicle coordinate system, not values with reference to the provisional reference camera. The provisional reference camera coordinate system needs to be transformed into the vehicle coordinate system.

The description below explains the process of transformation into the vehicle coordinate system as the post-process in accordance with steps 1 through 3 described below in order.

<Step 1>

Figure 17A:
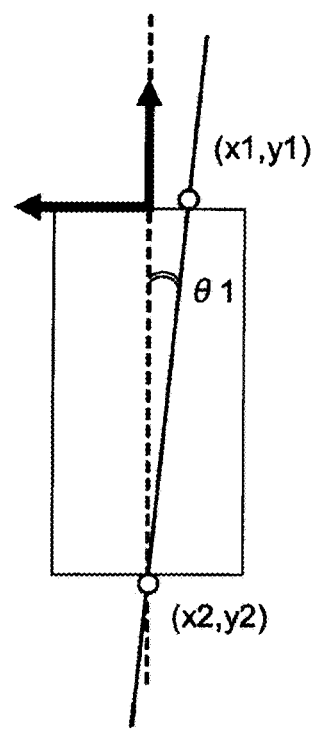
FIG. 17A is an explanatory diagram illustrating a method of transformation to a vehicle coordinate system and a technique of finding θ1 (viewed from above a vehicle)

As illustrated in FIG. 17A, the ECU 3 finds angle θ1 between the front camera 5 and the rear camera 11 in the vehicle coordinate system using design values (x1, y1) and (x2, y2) for camera positions (e.g., positions of the front camera 5 and the rear camera 11). The broken line indicates the front-back direction of the vehicle (passing through the position of the camera 11).

Figure 17B:
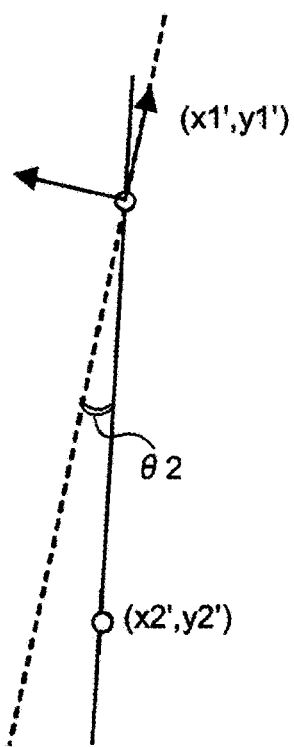
FIG. 17B is an explanatory diagram illustrating a method of transformation to a vehicle coordinate system and a technique of finding θ2 (viewed from above a vehicle)

As illustrated in FIG. 17B (provisional reference camera coordinate system), the ECU 3 finds θ2 between the front camera 5 and the rear camera 11 in the provisional reference camera coordinate system using positions (x1', y1') and (x2', y2') of the front camera 5 and the rear camera 11 in the provisional reference camera coordinate system. The broken line corresponds to an optical axis of the camera 5.

The ECU 3 finds rotation angle R using equation (1) below.

$$R = \theta 1 - \theta 2 \quad (1)$$

<Step 2>

Figure 18A:
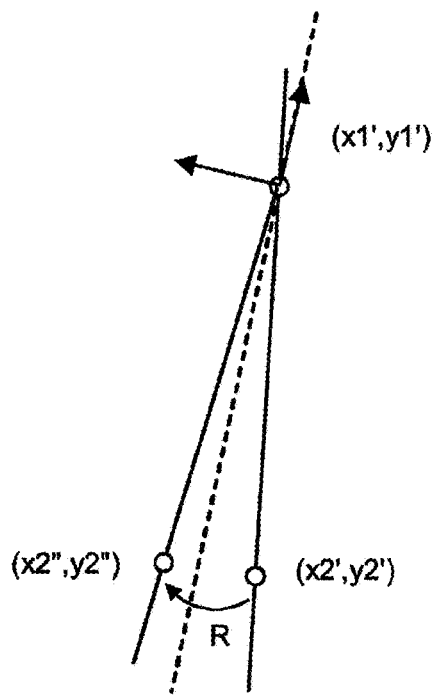
FIG. 18A is an explanatory diagram illustrating a method of transformation to a vehicle coordinate system and a technique of rotating the coordinate around the origin of a provisional reference camera coordinate system (viewed from above a vehicle)

As illustrated in FIG. 18A (provisional reference camera coordinate system), the ECU 3 rotates (x2', y2') with reference to the origin in the provisional reference camera coordinate system using rotation angle R found by equation (1), thereby giving the coordinate after rotation as (x2", y2").

Figure 18B:
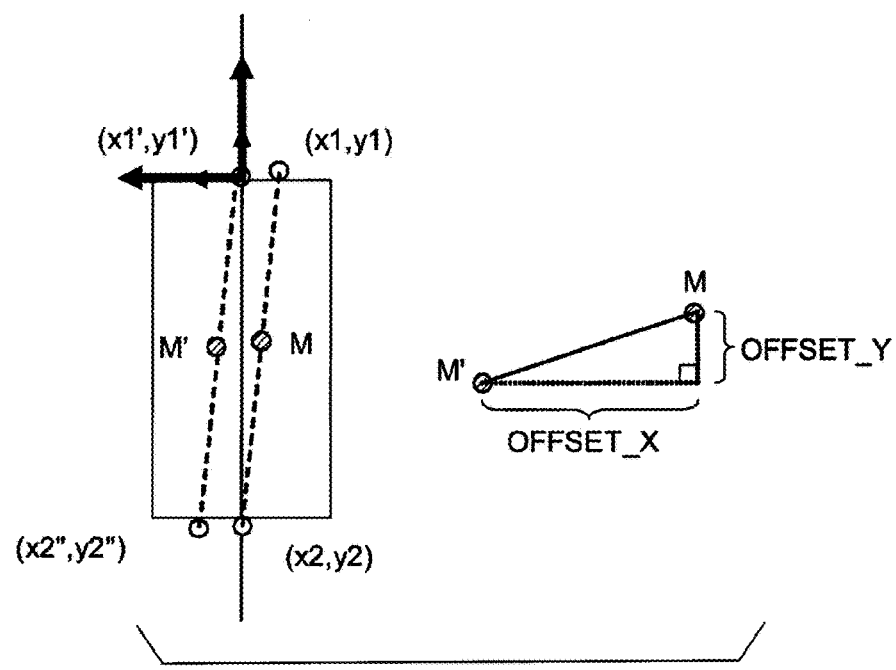
FIG. 18B is an explanatory diagram illustrating a method of transformation to a vehicle coordinate system and a technique of finding OFFSET_X and OFFSET_Y (viewed from above a vehicle)

FIG. 18B illustrates the vehicle coordinate system and the provisional reference camera coordinate system overlapped with each other. Midpoint M is defined between (x1, y1) and (x2, y2). Midpoint M' is defined between (x1', y1') and (x2", y2"). The ECU 3 finds an X-direction distance and a Y-direction distance for M and M', thereby giving the distances as OFFSET_X and OFFSET_Y, respectively.

<Step 3>

The ECU 3 adds rotation angle R, OFFSET_X, and OFFSET_Y found at steps 1 and 2 to corresponding values of Yaw, X, and Y for the cameras 5 through 11 with reference to each provisional reference camera. This completes the transformation into the vehicle coordinate system.

As described above in detail, the sixth embodiment can calibrate all the cameras 5 through 11 even when all the four cameras 5 through 11 are replaced or the ECU 3 is replaced.

(Seventh Embodiment)

The description below explains a seventh embodiment, in which explanation on contents similar to those in the first embodiment is omitted or simplified.

The seventh embodiment performs calibration using the single calibration sheet containing three patterns A B, and C (along with corresponding calibration marks).

Figure 19A:
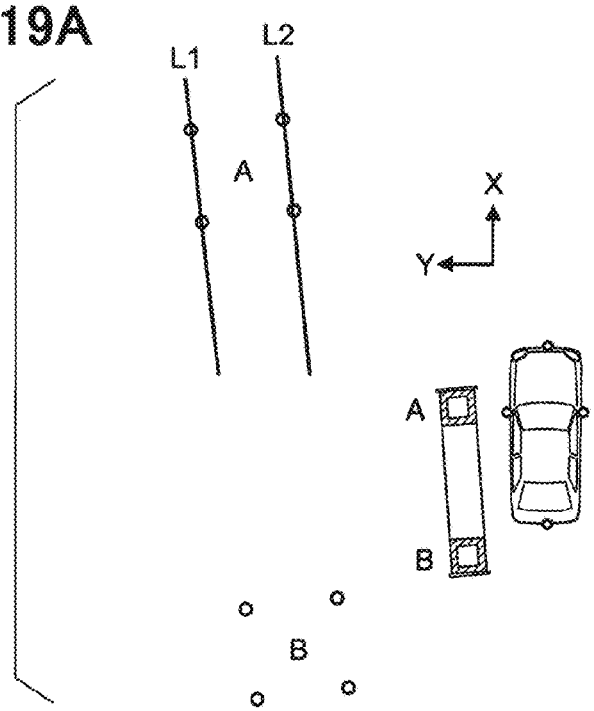
FIG. 19A is an explanatory diagram illustrating a technique of estimating pattern B using pattern A.

FIG. 19A illustrates a method of estimating pattern B from pattern A. The method finds two lines L1 and L2 using four apexes CT for the calibration mark of pattern A. The vehicle travels a predetermined distance in the corresponding direction to find apexes CT for the calibration mark of pattern B. The method is similar to the first embodiment.

The accuracy of lines L1 and L2 depends on the accuracy of pattern A (accordingly, of its apex CT for the calibration mark).

Figure 19B:
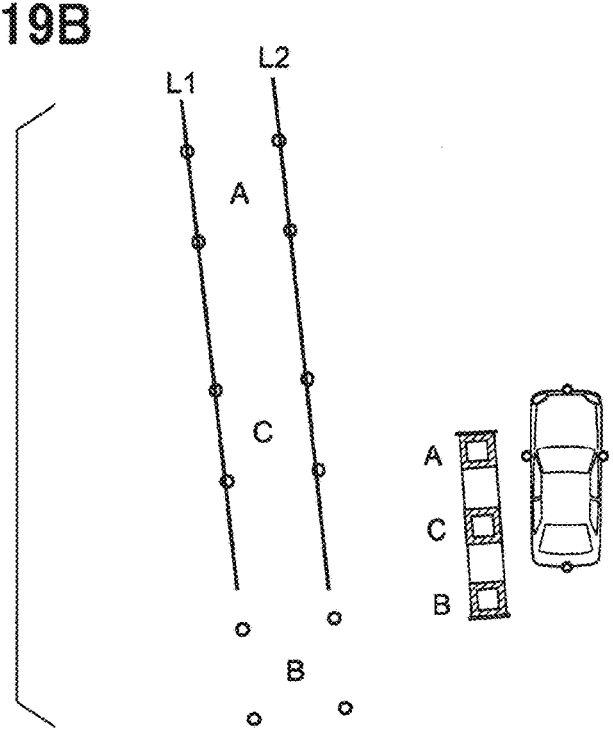
FIG. 19B is an explanatory diagram illustrating a technique of estimating pattern B using patterns A and C according to a seventh embodiment.

In this regard, as illustrated in FIG. 19B, the seventh embodiment uses a calibration sheet containing patterns A, C, and B provided in the longer direction. Patterns C and B are shaped similarly to pattern A.

Pattern C is provided as a graphic comparable to pattern A translated to pattern B along the longer direction of the calibration sheet 31. Pattern C is positioned to be intermediate between patterns A and B, for example.

The use of patterns A and C (in detail, apexes CT for the corresponding calibration marks) can improve the accuracy of lines L1 and L2. As a result, the accuracy of estimating pattern B can be further improved.

A publicly known least-square method can be used to find lines L1 and L2. The method minimizes a distance between line L1 (or line L2) and apexes CT for the calibration marks of corresponding patterns A and C.

Obviously, the present disclosure is not limited to the above-mentioned embodiments but may be variously embodied.

In each of the above-mentioned embodiments, for example, a function included in one component may be distributed to several components. Functions included in several components may be integrated into one component. At least part of the configuration of the embodiment may be replaced by a publicly known configuration that includes a comparable function. At least part of the configuration of the embodiment may be added to or may replace the configuration of another embodiment.

The above-mentioned calibration sheet may be available as not only a foldable calibration sheet, but also a plate-like calibration member that cannot be folded but can be bent.

Colors of the above-mentioned calibration sheet are not limited to specific ones, so that the above-mentioned calibration is available.

The end weight may be omitted, so that the above-mentioned calibration is available.

An onboard periphery image display device in a first example of the present disclosure is mounted on an automobile and comprises a plurality of cameras, a vehicle periphery image generation portion, a display apparatus, and an adjustment portion. The plurality of cameras are mounted on an automobile to image a periphery of the automobile. In accordance with a transformation rule determined for each camera provided to capture the image, the vehicle periphery image generation portion applies projection transform to the images captured by the cameras to generate a vehicle periphery image synthesized in a single image space. The vehicle periphery image represents the periphery of the automobile observed from a specified viewpoint. The display apparatus displays the vehicle periphery image generated by the vehicle periphery image generation portion. The adjustment portion adjusts the transformation rule determined for each of the cameras. In a situation where: a calibration member, in which a plurality of calibration patterns with predetermined sizes and shapes have a predetermined positional relationship, is placed around the automobile; a predetermined calibration pattern of the calibration patterns is placed in a capture area of a reference camera, which is a camera serving as a reference to adjust the transformation rule; and another calibration pattern of the calibration patterns is placed in a capture area of an adjustment-targeted camera, which is a camera targeted for adjustment of the transformation rule, the adjustment portion: detects a coordinate of an image of a reference calibration pattern through applying the projection transform to the image of the predetermined calibration pattern of the calibration member captured by the reference camera in accordance with the transformation rule determined for the reference camera; detects a coordinate of an image of an adjustment calibration pattern through applying the projection transform to the image of the another calibration pattern of the calibration member captured by the adjustment-targeted camera in accordance with the transformation rule determined for the adjustment-targeted camera; performs detecting a coordinate of an image of a provisional reference calibration pattern corresponding to the reference calibration pattern based on a positional relationship of the coordinate of the image of the adjustment calibration pattern with the calibration, patterns or detecting a coordinate of an image of a provisional adjustment calibration pattern corresponding to the adjustment calibration pattern based on a positional relationship of the coordinate of the image of the reference calibration pattern with the calibration patterns; and adjusts the transformation rule determined for the adjustment-targeted camera so that the coordinate of the image of the provisional reference calibration pattern matches the coordinate of the image of the reference calibration pattern or the coordinate of the image of the provisional adjustment calibration pattern matches the coordinate of the image of the adjustment calibration pattern.

A camera adjustment method in a first example of the present disclosure is provided for an onboard periphery image display device including a plurality of cameras that are mounted on an automobile to image a periphery of the automobile; a vehicle periphery image generation portion that, in accordance with a transformation rule determined for each camera provided to capture the image, applies projection transform to the images captured by the cameras to generate a vehicle periphery image synthesized in a single image space, wherein the vehicle periphery image represents the periphery of the automobile observed from a specified viewpoint; and a display apparatus that displays the vehicle periphery image generated by the vehicle periphery image generation portion, and the camera adjustment method is provided for adjusting the transformation rules for the cameras. In a situation where: a calibration member, in which a plurality of calibration patterns with predetermined sizes and shapes have a predetermined positional relationship, is placed around the automobile; a predetermined calibration pattern of the calibration patterns is placed in a capture area of a reference camera, which is a camera serving as a reference to adjust the transformation rule; and another calibration pattern of the calibration patterns is placed in a capture area of an adjustment-targeted camera, which is a camera targeted for adjustment of the transformation rule, the camera adjustment method comprises detecting a coordinate of an image of a reference calibration pattern through applying the projection transform to the image of the predetermined calibration pattern of the calibration member captured by the reference camera in accordance with the transformation rule determined for the reference camera; detecting an coordinate of an image of an adjustment calibration pattern through applying the projection transform to the image of the another calibration pattern of the calibration member captured by the adjustment-targeted camera in accordance with the transformation rule determined for the adjustment-targeted camera; performing detecting a coordinate of an image of a provisional reference calibration pattern corresponding to the reference calibration pattern based on a positional relationship of the coordinate of the image of the adjustment calibration pattern with the calibration patterns or detecting a coordinate of an image of a provisional adjustment calibration pattern corresponding to the adjustment calibration pattern based on a positional relationship of the coordinate of the image of the reference calibration pattern with the calibration patterns; and adjusting the transformation rule determined for the adjustment-targeted camera so that the coordinate of the image of the provisional reference calibration pattern matches the coordinate of the image of the reference calibration pattern or the coordinate of the image of the provisional adjustment calibration pattern matches the coordinate of the image of the adjustment calibration pattern.

As illustrated in FIG. 3, for example, the calibration member containing two or more calibration patterns at the predetermined positions may be placed so as to position the calibration patterns in the corresponding capture ranges for the reference camera and the adjustment-targeted camera. After that, coordinates for the reference calibration pattern (B) may be detected from an image captured by the reference camera. An image of the adjustment calibration pattern (A) may be detected from an image captured by the adjustment-targeted camera.

There may be a case of detecting coordinates for the image of the provisional reference calibration pattern (B') corresponding to the reference calibration pattern (B) based on the positional relationship among coordinates for the image of the adjustment calibration pattern (A) and both calibration patterns (A and B). In such a case, the transformation rule predetermined for the adjustment-targeted camera may be adjusted so that coordinates for the image of the provisional reference calibration pattern (B') match coordinates for the image of the reference calibration pattern (B).

Alternatively, there may be a case of detecting coordinates for the image of the provisional adjustment calibration pattern (A') corresponding to the adjustment calibration pattern (A) based on the positional relationship among coordinates for the image of the reference calibration pattern (B) and both calibration patterns (A and B). In such a case, the transformation rule predetermined for the adjustment-targeted camera may be adjusted so that coordinates for the image of the provisional adjustment calibration pattern (A') match coordinates for the image of the adjustment calibration pattern (A).

Even if the cameras' capture ranges do not overlap, the onboard periphery image display device and the camera adjustment method according to the present disclosure can easily calibrate adjustment-targeted cameras by placing the calibration patterns in the capture ranges and performing the above-mentioned process.

In a conventional one, a screen may display a single pattern to be very small. In such a case, the onboard periphery image display device and the camera adjustment method according to the present disclosure uses the calibration member containing different calibration patterns placed in capture ranges for the different cameras to improve the accuracy for the cameras to detect calibration patterns. The onboard periphery image display device and the camera adjustment method can provide an effect of accurately performing the calibration by performing the above-mentioned process.

An onboard periphery image display device in a second example of the present disclosure is mounted on an automobile and comprises a plurality of cameras, a vehicle periphery image generation portion, a display apparatus and an adjustment portion. The plurality of cameras are mounted on an automobile to image a periphery of the automobile. In accordance with a transformation rule determined for each camera provided to capture the image, the vehicle periphery image generation portion applies projection transform to the images captured by the cameras to generate a vehicle periphery image synthesized in a single image space. The vehicle periphery image represents the periphery of the automobile observed from a specified viewpoint. The display apparatus displays the vehicle periphery image generated by the vehicle periphery image generation portion. The adjustment portion adjusts the transformation rule determined for each of the cameras. In a situation where: calibration members, in which a plurality of calibration patterns with predetermined sizes and shapes have a predetermined positional relationship, are placed around the automobile; a predetermined calibration pattern of the calibration patterns is placed in a capture area of a predetermined camera; and another calibration pattern of the calibration patterns is placed in a capture area of another camera, the adjustment portion: of one set of two adjustment-targeted cameras that are capable of independently capturing two calibration patterns of a predetermined calibration member of the calibration members, uses one camera as a provisional reference camera and the other camera as an adjustment-targeted camera; detects an coordinate of an image of a provisional reference calibration pattern (B) through, in accordance with the transformation rule determined for the provisional reference camera, applying the projection transform to the image of a predetermined calibration pattern of the two calibration patterns captured by the provisional reference camera; detects a coordinate of an image of an adjustment calibration pattern through, in accordance with the transformation rule determined for the adjustment-targeted camera, applying the projection transform to the image of the other calibration pattern of the two calibration patterns captured by the adjustment-targeted camera; performs detecting a coordinate of an image of a provisional reference calibration pattern (B') corresponding to the provisional reference calibration pattern (B) based on a positional relationship of the coordinate of the image of the adjustment calibration pattern with the two calibration patterns or detecting a coordinate of an image of a provisional adjustment calibration pattern corresponding to the adjustment calibration pattern based on a positional relationship of the coordinate of the image of the provisional reference calibration pattern with the two calibration patterns; and adjusts the transformation rule determined for the adjustment-targeted camera so that the coordinate of the image of the provisional reference calibration pattern (B) matches the coordinate of the image of the provisional reference calibration pattern (B') or the coordinate of the image of the provisional adjustment calibration pattern matches the coordinate of the image of the adjustment calibration pattern. Said set-by-set-basis adjustment is applied to adjust the transformation rules for all the cameras.

A camera adjustment method in a second example of the present disclosure is provided for an onboard periphery image display device including: a plurality of cameras that are mounted on an automobile to image a periphery of the automobile; a vehicle periphery image generation portion that, in accordance with a transformation rule determined for each camera provided to capture the image, applies projection transform to the images captured by the cameras to generate a vehicle periphery image synthesized in a single image space, wherein the vehicle periphery image represents the periphery of the automobile observed from a specified viewpoint; and a display apparatus that displays the vehicle periphery image generated by the vehicle periphery image generation portion. The camera adjustment method is provided for adjusting the transformation rules for the cameras. In a situation where: calibration members, in which a plurality of calibration patterns with predetermined sizes and shapes have a predetermined positional relationship, are placed around the automobile; a predetermined calibration pattern of the calibration patterns is placed in a capture area of a predetermined camera; and another calibration pattern of the calibration patterns is placed in a capture area of another camera, the camera adjustment method comprises: of one set of two adjustment-targeted cameras that are capable of independently capturing two calibration patterns of a predetermined calibration member of the calibration members, using one camera as a provisional reference camera and the other camera as an adjustment-targeted camera; detecting an coordinate of an image of a provisional reference calibration pattern (B) through, in accordance with the transformation rule determined for the provisional reference camera, applying the projection transform to the image of a predetermined calibration pattern of the two calibration patterns captured by the provisional reference camera; detecting a coordinate of an image of an adjustment calibration pattern through, in accordance with the transformation rule determined for the adjustment-targeted camera, applying the projection transform to the image of the other calibration pattern of the two calibration patterns captured by the adjustment-targeted camera; performing detecting a coordinate of an image of a provisional reference calibration pattern (B') corresponding to the provisional reference calibration pattern (B) based on a positional relationship of the coordinate of the image of the adjustment calibration pattern with the two calibration patterns or detecting a coordinate of an image of a provisional adjustment calibration pattern corresponding to the adjustment calibration pattern based on a positional relationship of the coordinate of the image of the provisional reference calibration pattern with the two calibration patterns; and adjusting the transformation rule determined for the adjustment-targeted camera so that the coordinate of the image of the provisional reference calibration pattern (B') matches the coordinate of the image of the provisional reference calibration pattern (B) or the coordinate of the image of the provisional adjustment calibration pattern matches the coordinate of the image of the adjustment calibration pattern. Said set-by-set-basis adjustment is applied to adjust the transformation rules for all the cameras.

As illustrated in FIG. 14, for example, each calibration member contains several calibration patterns (A through H) that are each sized and shaped as specified and are arranged based on specified positional relationship. The calibration members are placed around the automobile. The specified calibration patterns (A through H) are placed in capture ranges for the specified cameras. The other calibration patterns (A through H) are placed in capture ranges for the other cameras. Two adjustment-targeted cameras may be defined as one set under the condition that the two adjustment-targeted cameras are capable of independently capturing two calibration patterns of the calibration member. One of the adjustment-targeted cameras may be assumed to be a provisional reference camera. The other camera may be assumed to be an adjustment-targeted camera. The transformation rule may be adjusted for all the cameras on a set basis according to the procedure described below.

Coordinates for an image of the provisional reference calibration pattern (B) may be detected from an image captured by the provisional reference camera. Coordinates for an image of the adjustment calibration pattern (A) may be detected from an image captured by the adjustment-targeted camera.

There may be a case of detecting coordinates for an image of the provisional reference calibration pattern (B') based on positional relationship among coordinates for the image of the adjustment calibration pattern (A) and both calibration patterns (A and B). In such a case, a transformation rule predetermined for the adjustment-targeted camera may be adjusted so that coordinates for the image of the provisional adjustment calibration pattern (A') match coordinates for the image of the adjustment calibration pattern (A).

There may be a case of detecting coordinates for an image of the provisional adjustment calibration pattern (A') based on positional relationship among coordinates for the image of the provisional reference calibration pattern (B) and both calibration patterns (A and B). In such a case, the transformation rule predetermined for the adjustment-targeted camera may be adjusted so that coordinates for the image of the provisional adjustment calibration pattern (A') match coordinates for the image of the adjustment calibration pattern (A).

There may be a case of adjusting all cameras due to replacement of the electronic control unit, for example. The onboard periphery image display device and the camera adjustment method according to the present disclosure can easily calibrate adjustment-targeted cameras by placing the calibration patterns in the corresponding capture ranges and performing the above-mentioned process even if the cameras' capture ranges do not overlap.

In a conventional one, a screen may display a single pattern to be very small. In such a case, the onboard periphery image display device and the camera adjustment method according to the present disclosure uses the calibration member containing different calibration patterns placed in capture ranges for the different cameras to improve the accuracy for the cameras to detect calibration patterns. The onboard periphery image display device and the camera adjustment method can provide an effect of accurately performing the calibration by performing the above-mentioned process.

The invention claimed is:
1. An onboard periphery image display device mounted on an automobile, comprising:
   a plurality of cameras, including a reference camera having a first capture area and an adjustment-targeted camera having a second capture area, that are mounted on an automobile to image a periphery of the automobile;

a vehicle periphery image generator that uses a processor to apply projection transform to images captured by the cameras in accordance with transformation rules determined for each camera to generate a vehicle periphery image synthesized in a single image space, wherein the vehicle periphery image represents the periphery of the automobile observed from a specified viewpoint;

a display apparatus that displays the vehicle periphery image generated by the vehicle periphery image generator; and an adjuster configured to adjust, using the processor, the transformation rule determined for at least the adjustment-targeted camera, wherein, an elongated calibration member is placed around the automobile, the elongated calibration member comprising first and second calibration patterns with predetermined sizes and shapes separated from each other based on a predetermined positional relationship, and placement of the first calibration pattern is in a region of the first capture area that does not overlap with the second capture area and placement of the second calibration pattern is in a region of the second capture area that is outside of the region of the first capture area being occupied by the first calibration pattern, and the adjuster is configured to:

detect a coordinate of an image of a reference calibration pattern by applying projection transform to an image of the first calibration pattern captured by the reference camera in accordance with the transformation rule determined for the reference camera;

detect a coordinate of an image of an adjustment calibration pattern by applying projection transform to an image of the second calibration pattern captured by the adjustment-targeted camera in accordance with the transformation rule determined for the adjustment-targeted camera;

detect:

a coordinate of an image of a provisional reference calibration pattern based at least in part on the coordinate of the image of the adjustment calibration pattern and the predetermined positional relationship between the first and the second calibration patterns, wherein the coordinate of the image of the provisional reference calibration pattern corresponds to the reference calibration pattern, or a coordinate of an image of a provisional adjustment calibration pattern based at least in part on the coordinate of the image of the reference calibration pattern and the predetermined positional relationship between the first and the second calibration patterns, wherein the coordinate of the image of the provisional adjustment calibration pattern corresponds to the adjustment calibration pattern; and determine an adjusted transformation rule for the adjustment-targeted camera by matching the coordinate of the image of the provisional reference calibration pattern with the coordinate of the image of the reference calibration pattern, or by matching the coordinate of the image of the provisional adjustment calibration pattern with the coordinate of the image of the adjustment calibration pattern; and apply projection transform to a subsequent image captured by the adjustment-targeted camera using the adjusted transformation rule.

2. The onboard periphery image display device according to claim 1, wherein the calibration member is a sheet.

3. The onboard periphery image display device according to claim 1, wherein the calibration patterns are formed at opposite ends of the elongated calibration member in a longitudinal direction.

4. The onboard periphery image display device according to claim 1, wherein the calibration member is rectangular in plan view.

5. The onboard periphery image display device according to claim 1, wherein the calibration member is made of fiber having a predetermined or less contraction/expansion with temperature or humidity.

6. The onboard periphery image display device according to claim 1, wherein the calibration member is foldable into a scroll.

7. The onboard periphery image display device according to claim 1, wherein rod-shaped weights are attached at opposite ends of the elongated calibration member in a longitudinal direction.

8. The onboard periphery image display device according to claim 7, wherein a material of the weight is resin or metal.

9. An onboard periphery image display device mounted on an automobile, comprising:

a plurality of cameras, including a first camera having a first capture area and a second camera having a second capture area, that are mounted on an automobile to image a periphery of the automobile;

a vehicle periphery image generator that uses a processor to apply projection transform to images captured by the cameras in accordance with transformation rules determined for each camera to generate a vehicle periphery image synthesized in a single image space, wherein the vehicle periphery image represents the periphery of the automobile observed from a specified viewpoint;

a display apparatus that displays the vehicle periphery image generated by the vehicle periphery image generator; and an adjuster that adjusts, using the processor, the transformation rule determined for each of the cameras, wherein, elongated calibration members are placed around the automobile, the elongated calibration members each comprising a adjustment calibration pattern (A) and a provisional reference calibration pattern (B) with predetermined sizes and shapes separated from each other based on a predetermined positional relationship, and placement of the provisional reference calibration pattern (B) is in a region of the first capture area that does not overlap with the second capture area, and placement of the adjustment calibration pattern (A) is in a region of the second capture area that is outside of the region of the first capture area being occupied by the provisional reference calibration pattern (B), and the adjuster is configured to:

detect a coordinate of an image of the provisional reference calibration pattern (B) by applying projection transform to an image of the provisional reference calibration pattern (B) captured by the first camera in accordance with the transformation rule determined for the first camera;

detect a coordinate of an image of the adjustment calibration pattern (A) by applying projection transform to an image of the adjustment calibration pattern (A) captured by the second camera in accordance with the transformation rule determined for the second camera;

detect:
- a coordinate of an image of a provisional reference calibration pattern (B') based at least in part on the coordinate of the image of the adjustment calibration pattern (A) and the predetermined positional relationship between the provisional reference calibration pattern (B) and adjustment calibration pattern (A), wherein the coordinate of the image of the provisional reference calibration pattern (B') corresponds to the provisional reference calibration pattern (B), or
- a coordinate of an image of a provisional adjustment calibration pattern (A') based at least in part on the coordinate of the image of the provisional reference calibration pattern (B) and the predetermined positional relationship between the provisional reference calibration pattern (B) and adjustment calibration pattern (A), wherein the coordinate of the image of the provisional adjustment calibration pattern (A') corresponds to the adjustment calibration pattern (A);

determine an adjusted transformation rule for the second camera by matching the coordinate of the image of the provisional reference calibration pattern (B') with the coordinate of the image of the provisional reference calibration pattern (B), or by matching the coordinate of the image of the provisional adjustment calibration pattern (A') with the coordinate of the image of the adjustment calibration pattern (A); and apply projection transform to a subsequent image captured by the second camera using the adjusted transformation rule.

10. A camera adjustment method for adjusting the transformation rules for at least one of a reference camera having a first capture area and an adjustment-targeted camera having a second capture area, the cameras configured to be mounted on an automobile to image a periphery of the automobile, the automobile including an onboard periphery image display device, the display device including: (i) a vehicle periphery image generator that uses a processor to apply projection transform to images captured by the cameras in accordance with transformation rules determined for each camera to generate a vehicle periphery image synthesized in a single image space, wherein the vehicle periphery image represents the periphery of the automobile observed from a specified viewpoint; and (ii) a display apparatus that displays the vehicle periphery image generated by the vehicle periphery image generator, wherein the camera adjustment method comprises:

placing an elongated calibration member around the automobile, the elongated calibration member comprising first and second calibration patterns with predetermined sizes and shapes separated from each other based on a predetermined positional relationship, and placement of the first calibration pattern is in a region of the first capture area that does not overlap with the second capture area, and placement of the second calibration pattern is in a region of the second capture area that is outside of the region of the first capture area being occupied by the first calibration pattern;

detecting a coordinate of an image of a reference calibration pattern by applying projection transform to an image of the first calibration pattern captured by the reference camera in accordance with the transformation rule determined for the reference camera;

detecting a coordinate of an image of an adjustment calibration pattern by applying projection transform to an image of the second calibration pattern captured by the adjustment-targeted camera in accordance with the transformation rule determined for the adjustment-targeted camera;

detecting:
- a coordinate of an image of a provisional reference calibration pattern based at least in part on the image of the adjustment calibration pattern and the predetermined positional relationship between the first and the second calibration patterns, wherein the coordinate of the image of the provisional reference calibration pattern corresponds to the reference calibration pattern, or
- a coordinate of an image of a provisional adjustment calibration pattern based at least in part on the coordinate of the image of the reference calibration pattern and the predetermined positional relationship between the first and the second calibration patterns, wherein the coordinate of the image of the provisional reference calibration pattern corresponds to the reference calibration pattern;

determining an adjusted transformation rule for the adjustment-targeted camera by matching the coordinate of the image of the provisional reference calibration pattern with the coordinate of the image of the reference calibration pattern, or by matching the coordinate of the image of the provisional adjustment calibration pattern with the coordinate of the image of the adjustment calibration pattern; and applying projection transform to a subsequent image captured by the adjustment-targeted camera using the adjusted transformation rule.

11. A camera adjustment method for adjusting the transformation rules for at least one camera of a first camera having a first capture area and a second camera having a second capture area, the cameras configured to be mounted on an automobile to image a periphery of the automobile, the automobile including an onboard periphery image display device, the display device including: (i) a vehicle periphery image generator that uses a processor to apply projection transform to images captured by the cameras in accordance with transformation rules determined for each camera to generate a vehicle periphery image synthesized in a single image space, wherein the vehicle periphery image represents the periphery of the automobile observed from a specified viewpoint; and (ii) a display apparatus that displays the vehicle periphery image generated by the vehicle periphery image generator, wherein the camera adjustment method comprises, placing elongated calibration members around the automobile, the elongated calibration members each comprising an adjustment calibration pattern (A) and a provisional reference calibration pattern (B) with predetermined sizes and shapes separated from each other based on a predetermined positional relationship, and placement of the provisional reference calibration pattern is in a region of the first capture area that does not overlap with the second capture area, and placement of the adjustment calibration pattern is in a region of the second capture area that is outside of the region of the first capture area being occupied by the provisional reference calibration pattern;

detecting a coordinate of an image of a provisional reference calibration pattern (B) by applying projection transform to an image of the provisional reference calibration pattern (B) captured by the first camera in accordance with the transformation rule determined for the first camera;

detecting a coordinate of an image of an adjustment calibration pattern (A) by applying projection transform to an image of the adjustment calibration pattern (A) captured by the second camera in accordance with the transformation rule determined for the second camera;

detecting:

a coordinate of an image of a provisional reference calibration pattern (B') based at least in part on the coordinate of the image of the adjustment calibration pattern (A) and the predetermined positional relationship between the adjustment calibration pattern (A) and the provisional reference calibration pattern (B), wherein the coordinate of the image of the provisional reference calibration (B') pattern corresponds to the provisional reference calibration pattern (B), or a coordinate of an image of a provisional adjustment calibration pattern (A') based at least in part on the coordinate of the image of the provisional reference calibration pattern (B) and the predetermined positional relationship between the adjustment calibration pattern (A) and the provisional reference calibration member (B), wherein the coordinate of the image of the provisional adjustment calibration pattern corresponds to the adjustment calibration pattern;

determining an adjusted transformation rule for the second camera by matching the coordinate of the image of the provisional reference calibration pattern (B') with the coordinate of the image of the provisional reference calibration pattern (B), or by matching the coordinate of the image of the provisional adjustment calibration pattern (A') with the coordinate of the image of the adjustment calibration pattern (A); and applying projection transform to a subsequent image captured by the second camera using the adjusted transformation rule.

* * * * *